(12) United States Patent
Ohashi et al.

(10) Patent No.: US 7,775,309 B2
(45) Date of Patent: Aug. 17, 2010

(54) PUMP UNIT

(75) Inventors: Ryota Ohashi, Amagasaki (JP);
Hironori Sumomozawa, Amagasaki (JP); Nobuhisa Kamikawa, Amagasaki (JP); Masahisa Kawamura, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 728 days.

(21) Appl. No.: 11/623,687

(22) Filed: Jan. 16, 2007

(65) Prior Publication Data
US 2007/0163817 A1 Jul. 19, 2007

Related U.S. Application Data

(63) Continuation-in-part of application No. 10/981,539, filed on Nov. 5, 2004, now Pat. No. 7,299,888.

(30) Foreign Application Priority Data
Nov. 11, 2003 (JP) .............................. 2003-381523

(51) Int. Cl.
*B60K 17/28* (2006.01)
(52) U.S. Cl. ..................... 180/53.4; 180/53.6; 180/305; 60/484; 60/486
(58) Field of Classification Search ........... 60/484–487; 180/53.1, 53.4, 53.6, 305–308
See application file for complete search history.

(56) References Cited

U.S. PATENT DOCUMENTS 3,292,723 A * 12/1966 Pinkerton et al. ........ 180/24.06

(Continued)

FOREIGN PATENT DOCUMENTS

EP 1 350 421 A1 10/2003

(Continued)

*Primary Examiner*—Paul N Dickson
*Assistant Examiner*—Laura Freedman
(74) *Attorney, Agent, or Firm*—Sterne, Kessler, Goldstein & Fox P.L.L.C.

(57) ABSTRACT

There is provided a pump unit including plurality of hydraulic pump bodies respectively fluidly connected to plurality of hydraulic motor bodies, which are disposed away from the pump unit, so as to form closed circuits, the pump unit including: a housing accommodating the plurality of hydraulic pump bodies so that the plurality of hydraulic pump bodies are operatively driven by a common driving source; a charge pump body operatively driven by the driving source; a suction fluid passage fluidly connected to a suction side of the charge pump body; a discharge fluid passage fluidly connected to a discharge side of the charge pump body; a charge passage for replenishing a part of pressurized fluid in the discharge fluid passage into each of the closed circuits; and a working machine operating fluid passage for supplying a part of the pressurized fluid in the discharge fluid passage toward an external hydraulic actuator.

4 Claims, 27 Drawing Sheets

U.S. PATENT DOCUMENTS

| | | | | |
|---|---|---|---|---|
| 3,469,381 A * | 9/1969 | Burrough et al. | | 56/209 |
| 3,481,419 A * | 12/1969 | Hunck et al. | | 180/243 |
| 4,124,079 A * | 11/1978 | Crow | | 172/114 |
| 4,129,192 A * | 12/1978 | Todeschini et al. | | 180/6.48 |
| 4,395,865 A | 8/1983 | Davis, Jr. et al. | | |
| 4,579,183 A | 4/1986 | Irikura et al. | | |
| 4,809,796 A | 3/1989 | Yamaoka et al. | | |
| 4,867,001 A | 9/1989 | Sasaki et al. | | |
| 4,886,142 A * | 12/1989 | Yamaoka et al. | | 180/242 |
| 5,046,994 A | 9/1991 | Hasegawa et al. | | |
| 5,590,737 A * | 1/1997 | Azuma et al. | | 180/308 |
| 5,809,756 A | 9/1998 | Scag et al. | | |
| 5,957,229 A * | 9/1999 | Ishii | | 180/6.48 |
| 6,196,348 B1 * | 3/2001 | Yano et al. | | 180/242 |
| 6,260,641 B1 * | 7/2001 | Hidaka | | 180/6.44 |
| 6,325,166 B1 * | 12/2001 | Shimada et al. | | 180/6.48 |
| 6,332,393 B1 * | 12/2001 | Trimble | | 92/12.2 |
| 6,425,244 B1 * | 7/2002 | Ohashi et al. | | 60/464 |
| 6,457,546 B1 | 10/2002 | Ishimaru et al. | | |
| 6,487,856 B1 * | 12/2002 | Ohashi et al. | | 60/464 |
| 6,571,894 B2 | 6/2003 | Ishimaru et al. | | |
| 6,578,656 B2 * | 6/2003 | Samejima et al. | | 180/291 |
| 6,601,474 B2 | 8/2003 | Ishimaru et al. | | |
| 6,672,843 B1 * | 1/2004 | Holder et al. | | 417/201 |
| 6,705,840 B1 * | 3/2004 | Hauser et al. | | 417/205 |
| 6,811,509 B1 * | 11/2004 | Langenfeld et al. | | 475/83 |
| 6,820,403 B2 * | 11/2004 | Umemoto | | 56/10.8 |
| 6,840,879 B1 * | 1/2005 | Langenfeld et al. | | 475/83 |
| 6,935,454 B1 * | 8/2005 | Hauser et al. | | 180/242 |
| 7,004,268 B2 * | 2/2006 | Irikura | | 180/6.3 |
| 7,028,472 B2 * | 4/2006 | Ohashi et al. | | 60/456 |
| 7,044,259 B2 * | 5/2006 | Stoll et al. | | 180/307 |
| 7,185,577 B2 * | 3/2007 | Ohashi et al. | | 91/499 |
| 7,316,287 B2 * | 1/2008 | Ohashi et al. | | 180/307 |
| 7,361,000 B2 * | 4/2008 | Ohashi et al. | | 417/269 |
| 7,371,055 B2 * | 5/2008 | Ohashi et al. | | 417/269 |
| 2002/0003051 A1 | 1/2002 | Ishii et al. | | |
| 2002/0014358 A1 | 2/2002 | Osuga et al. | | |
| 2002/0124542 A1 * | 9/2002 | Ishimori | | 56/17.5 |
| 2002/0157391 A1 * | 10/2002 | Ohashi et al. | | 60/464 |
| 2003/0033803 A1 * | 2/2003 | Ohashi et al. | | 60/486 |
| 2003/0162618 A1 * | 8/2003 | Hasegawa et al. | | 475/72 |
| 2003/0188909 A1 * | 10/2003 | Ohashi et al. | | 180/300 |
| 2007/0144169 A1 * | 6/2007 | Ohashi et al. | | 60/488 |
| 2007/0272469 A1 * | 11/2007 | Ohashi et al. | | 180/306 |
| 2008/0054717 A1 * | 3/2008 | Ohashi et al. | | 303/116.4 |
| 2008/0152517 A1 * | 6/2008 | Ishii et al. | | 417/423.5 |

FOREIGN PATENT DOCUMENTS

| | | |
|---|---|---|
| JP | 2000-025639 | 1/2000 |
| JP | 2000-270652 | 10/2000 |
| JP | 2002-205561 | 7/2002 |
| JP | 2002-238324 | 8/2002 |
| JP | 2003-276461 | 9/2003 |

\* cited by examiner (a)

(b)

(a)

(b)

(a)

(b)

(a)

(b)

(a)

(b)

(a)

(b)

PUMP UNIT

BACKGROUND OF THE INVENTION

1. Field of the Invention

The present invention relates to a pump unit that includes plurality of hydraulic pump bodies respectively fluidly connected to plurality of hydraulic motor bodies, which are disposed away from the pump unit, so as to form closed circuits.

2. Related Art

In a working vehicle, it is desirable to have a free space at a central portion in a width direction of the vehicle without enlarging the entire vehicle size. That is, by forming the free space at the central portion in the width direction of the vehicle, the free space can be used as an installation space for a mid-mount mower, used as a center discharger path and, further, used as an installation space for a mower lifting cylinder, thus enhancing the degree of freedom of design of the working vehicle.

For example, in U.S. Pat. Nos. 4,395,865 and 5,809,756 (hereinafter, referred to as cited references 1 and 2, respectively), there is proposed a working vehicle comprising a hydraulic pump unit operatively connected to a driving source, and a pair of hydraulic motor units allocated and arranged on both sides in a width direction of a vehicle so as to drive a pair of right and left driving axles, wherein the hydraulic pump unit and the pair of hydraulic motor units are fluidly connected to each other via conduits so as to form a pair of HST (hydrostatic transmission).

The conventional working vehicle having the above configuration is effective in preventing a traveling-system transmission mechanism to be interposed between the pair of driving axles, but is ineffective with regard to the following points.

That is, in the working vehicle including the pair of HST as its traveling-system hydraulic actuator, a working machine such as a mower device, and a working-machine-system hydraulic actuator such as a hydraulic lifting device for lifting up and down the working machine may be provided according to specification.

In the working machine including the HST and the working-machine-system hydraulic actuator, a traveling-system hydraulic pressure source for replenishing the HST, and a working-machine-system hydraulic pressure source for supplying operation fluid to the working-machine-system hydraulic actuator must be provided.

However, in the conventional working vehicle of the type in which the traveling-system hydraulic pressure source and the working-device-system hydraulic pressure source are provided, there have not been made proposal in view of effectively forming the hydraulic pressure sources.

The present invention has been made in view of the above conventional art, and it is an object of the present invention to provide a pump unit applicable to a working vehicle equipped with a working machine, wherein the pump unit includes plurality of hydraulic pump bodies respectively fluidly connected to plurality of hydraulic motor bodies, which are disposed away from the pump unit, so as to form closed circuits, and is capable of improving the efficiency in replenishing the closed circuits and supplying operation fluid to the working-machine-system hydraulic actuator.

SUMMARY OF THE INVENTION

According to the present invention, there is provided a pump unit including plurality of hydraulic pump bodies respectively fluidly connected to plurality of hydraulic motor bodies, which are disposed away from the pump unit, so as to form closed circuits, the pump unit including: a housing accommodating the plurality of hydraulic pump bodies so that the plurality of hydraulic pump bodies are operatively driven by a common driving source; a charge pump body operatively driven by the driving source; a suction fluid passage fluidly connected to a suction side of the charge pump body; a discharge fluid passage fluidly connected to a discharge side of the charge pump body; a charge passage for replenishing a part of pressurized fluid in the discharge fluid passage into each of the closed circuits; and a working machine operating fluid passage for supplying a part of the pressurized fluid in the discharge fluid passage toward an external hydraulic actuator.

With the pump unit, it is possible to obtain the operation fluid for the working-machine-system hydraulic actuator such as a hydraulic lifting device without providing an additional hydraulic pressure source such as an auxiliary pump, thereby reducing the cost.

Preferably, the pump unit further includes a filter that is inserted within the suction fluid passage.

With the configuration, it is possible to omit a mounting member for fixing the filter at a position to be mounted such as a body frame of the working vehicle, and an external conduit for fluidly connecting between the filter and the pump unit.

Preferably, the pump unit further includes a working machine switching valve for selectively communicating or shutting off the working machine operating fluid passage.

With the configuration, it is possible to omit a mounting member for fixing the working machine switching valve at a position to be mounted such as a body frame of the working vehicle, and an external conduit for fluidly connecting between the working machine switching valve and the pump unit.

For example, the working machine operating fluid passage includes a proximal end fluidly connected to the discharge fluid passage and distal ends branched so as to have two working machine operating fluid ports. In the configuration, the working machine switching valve is inserted within one of the two branched passages.

Preferably, hydraulic fluid ports to the plurality of hydraulic motor bodies and a working machine operating fluid port to the external hydraulic actuator are faced to the same direction with respect to one another.

With the configuration, it is possible to improve the workability in connecting conduits to the ports.

In the above various configurations, the pump unit preferably further includes a relief valve that has a primary side fluidly connected to the discharge fluid passage. In the configuration, the working machine operating fluid passage is fluidly connected to the discharge fluid passage via a sequence valve; and the charge passage is fluidly connected to the discharge fluid passage via a pressure-reducing valve.

More preferably, the pump unit further includes: a PTO shaft operatively driven by the common driving source; a hydraulic PTO clutch for selectively engaging or disengaging power transmission from the common driving source to the PTO shaft; a PTO fluid passage having a proximal end fluidly connected to the discharge fluid passage via an orifice and a distal end fluidly connected to the PTO clutch; a PTO switching valve inserted within the PTO fluid passage; and a PTO relief valve having a primary side fluidly connected to the PTO fluid passage.

BRIEF DESCRIPTION OF THE DRAWINGS

The above, and other objects, features and advantages of the present invention will become apparent from the detailed description thereof in conjunction with the accompanying drawings wherein.

FIGS. 13(a) and 13(b) shows states where an accumulator is at an initial position and at a stroke end position, respectively.

DETAILED DESCRIPTION OF THE PREFERRED EMBODIMENTS

Embodiment 1

Hereinafter, description will be given of a pump unit according to a preferred embodiment of the present invention with reference to the accompanying drawings.

The pump unit according to the present invention configures a traveling-system transmission mechanism in cooperation with a hydraulic motor unit fluidly connected via a hydraulic circuit and driven by an action of a pressure oil in the hydraulic circuit and, also, configures a PTO-system transmission mechanism for outputting power to a working machine.

Figure 2:
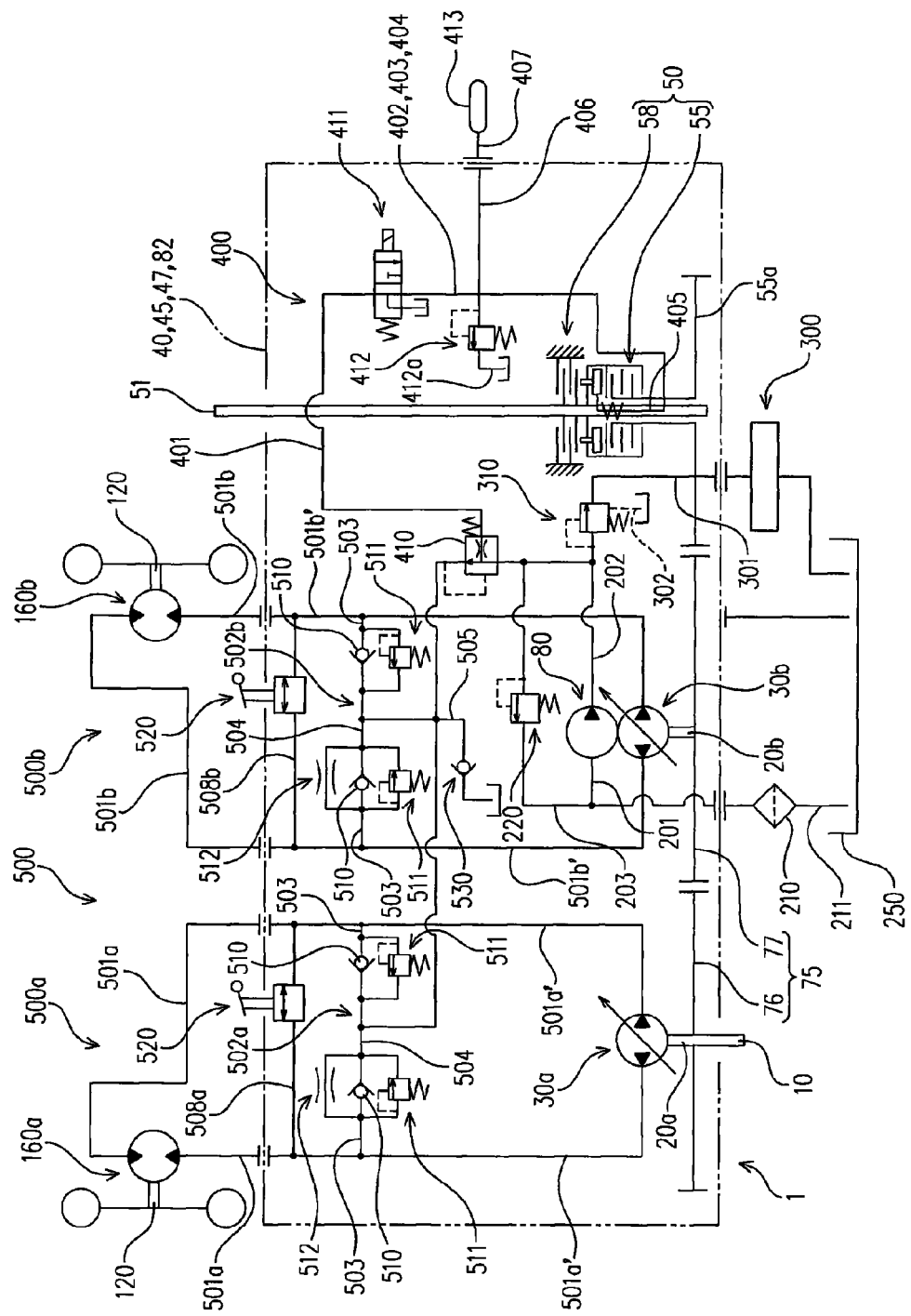
FIG. 2 is a hydraulic circuit diagram of the pump unit.
Figure 3:
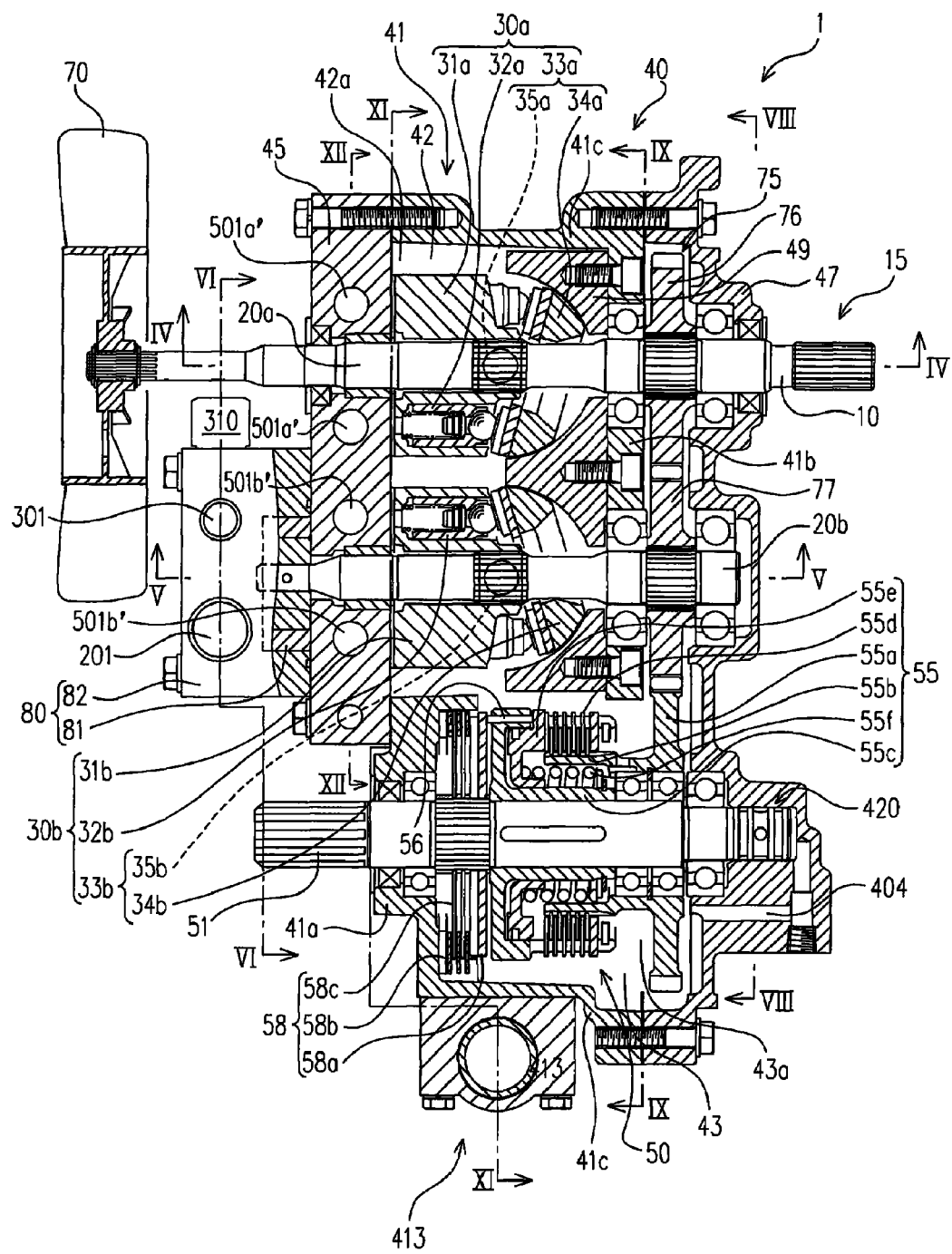
FIG. 3 is a transverse sectional plan view of the pump unit.

FIGS. 1(a) and 1(b) show a side view and a plan view of the working vehicle 100 to which the pump unit 1 according to this embodiment is applied. FIG. 2 shows a hydraulic circuit diagram of the pump unit 1. FIG. 3 shows a transverse sectional plan view of the pump unit 1 according to this embodiment.

First, description will be given of the working vehicle 100.

In this embodiment, the working vehicle 100 is of a mid-mount type in which a ground working machine 140 is arranged between a front wheel (caster 130 in this embodiment shown in the figure) and a rear wheel (driving wheel 120 in this embodiment shown in the figure) with respect to a longitudinal direction of the vehicle.

More specifically, the working vehicle 100, as shown in FIGS. 1(a) and 1(b), comprises a body frame 110, a pair of right and left driving wheels (rear wheels in this embodiment) 120 supported by the body frame 110, a pair of right and left casters 130 supported by the body frame 110 so as to be arranged on one side (forward side in this embodiment) in the longitudinal direction of the vehicle of the driving wheels 120, a ground working machine (mower in this embodiment) 140 supported by the body frame 110 so as to be positioned between the driving wheels 120 and the casters 130, a driving source 150 supported by the body frame 110 so as to be positioned on the opposite side (backward side in this embodiment) of the ground working machine 140 with the driving wheels 120 along the longitudinal direction of the vehicle, first and second hydraulic motor units 160a, 160b operatively connected at their motor shafts to the pair of right and left driving wheels 120, respectively, and the pump unit 1 according to this embodiment.

The first and second hydraulic motor units 160a, 160b are allocated and arranged on the left and right side along the width direction of the vehicle. Thus, the working vehicle 100 prevents the traveling-system transmission mechanism from being positioned at the central portion in the width direction of the vehicle, and secures a free space at the central portion in the width direction of the body frame 110.

Hereinafter, description will be given of the pump unit 1 according to this embodiment in detail.

Figure 4:
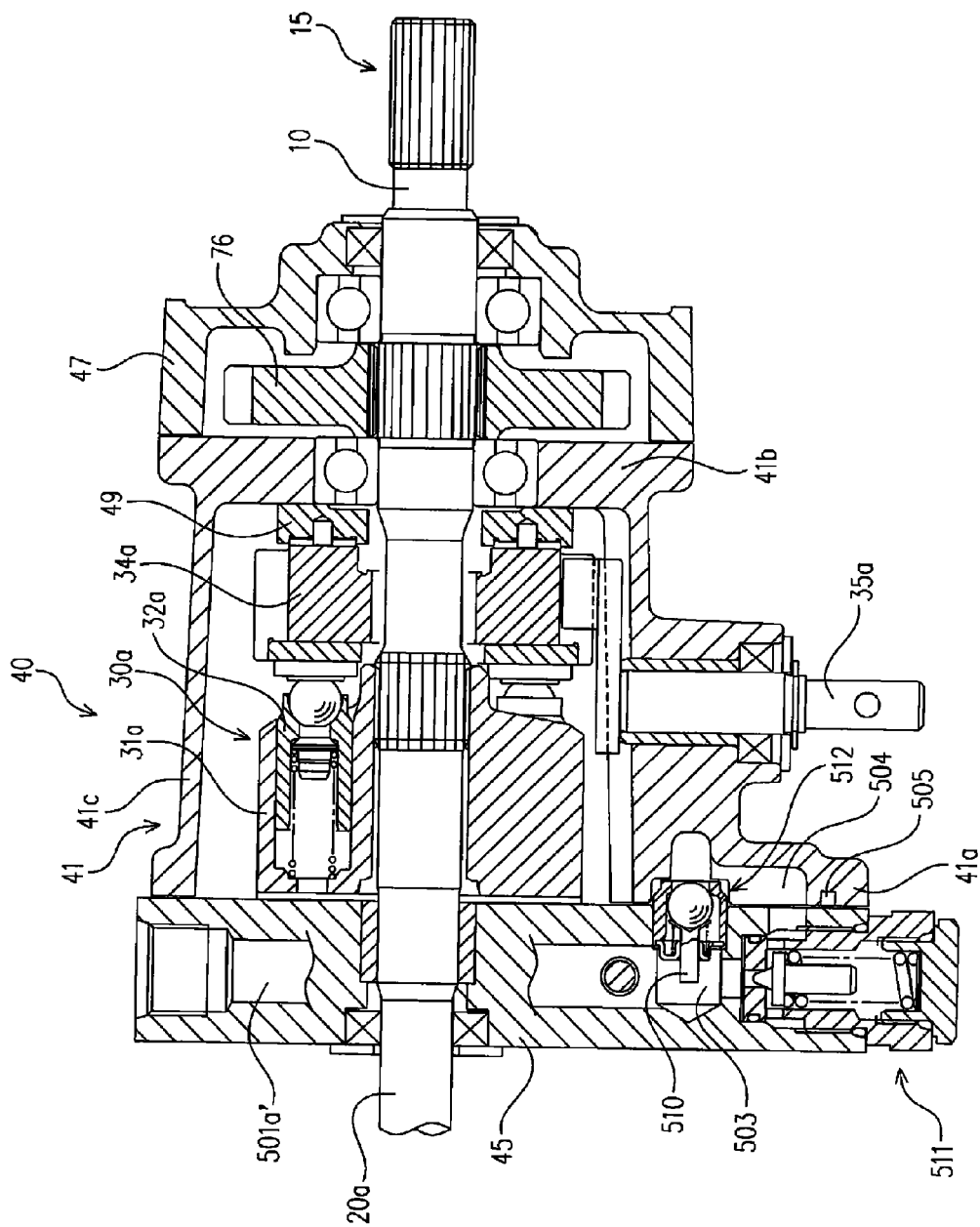
FIG. 4 is a cross sectional view taken along line IV-IV in FIG. 3.
Figure 5:
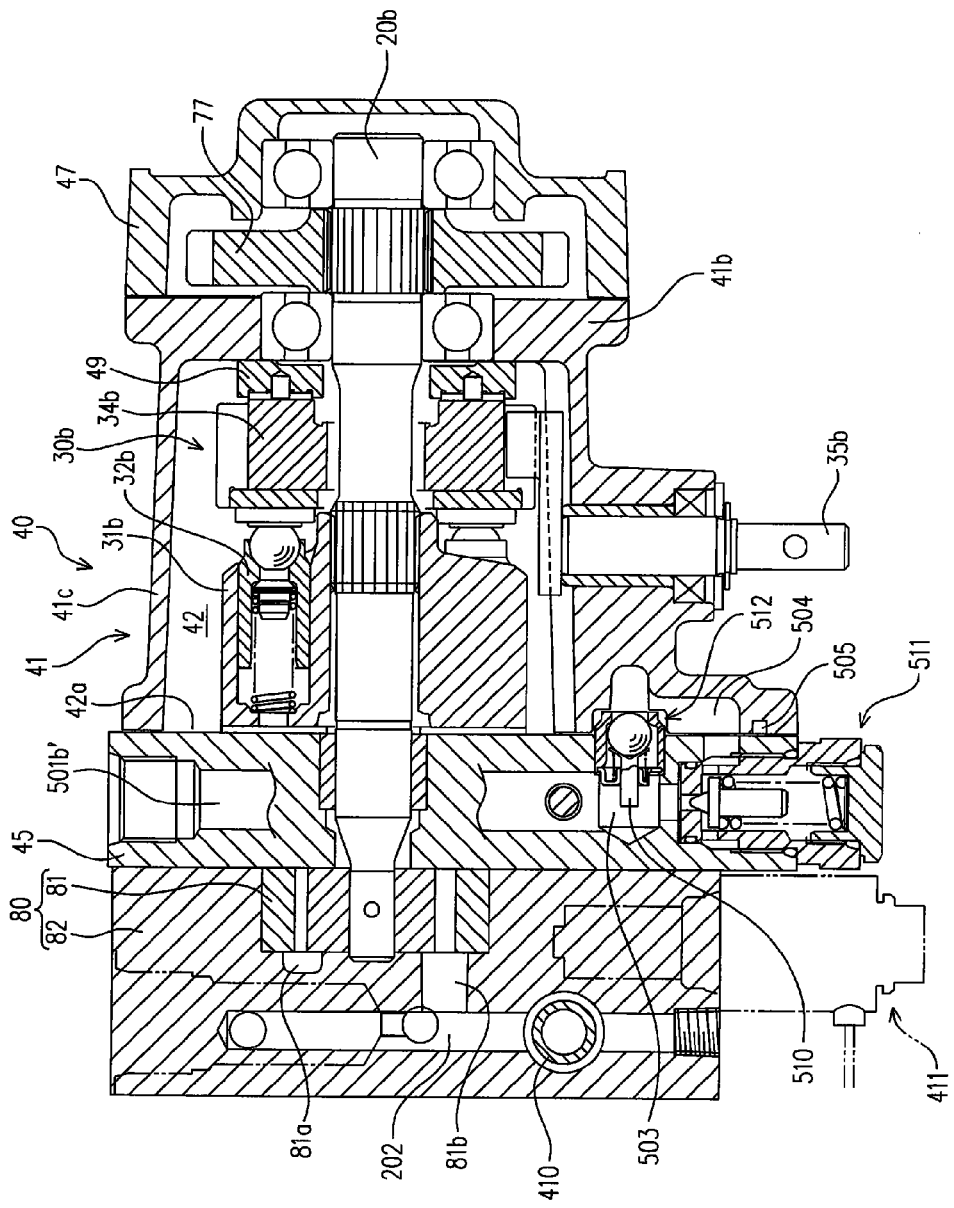
FIG. 5 is a cross sectional view taken along line V-V in FIG. 3.

FIGS. 4 and 5 show cross sectional views taken along lines IV-IV and line V-V in FIG. 3, respectively.

The pump unit 1, as described above, is configured so as to be fluidly connected to the hydraulic motors 160a, 160b arranged spaced apart from the pump unit 1 via the hydraulic circuit so that the hydraulic motors 160a, 160b output the power, which is input from the driving source 150 to the pump unit 1 and transmitted to the hydraulic motor units 160a, 160b via the action of the oil pressure, thereby driving the driving wheels 120. That is, the pump unit 1 forms the traveling-system transmission mechanism serving as a main transmission path together with the hydraulic motor units 160a, 160b.

The pump unit 1 is configured so as to branch the power from the driving source 150 and extract the driving power of the ground working machine 140. That is, the pump unit 1 also forms a part of the PTO-system transmission mechanism.

More specifically, as shown in FIGS. 3 to 5, the pump unit 1 comprises an input shaft 10 operatively connected to the driving source 150, first and second pump shafts 20a, 20b operatively connected to the input shaft 10, first and second hydraulic pump bodies 30a, 30b driven by the first and second pump shafts 20a, 20b, respectively, a housing 40 for supporting the input shaft 10, the first pump shaft 20a and the second pump shaft 20b and, also, containing therein the first and second hydraulic pump bodies 30a, 30b, and a PTO device 50 contained in the housing 40.

As shown in FIG. 2, the first hydraulic pump body 30a and the second hydraulic pump body 30b are fluidly connected to the first hydraulic motor unit 160a and the second hydraulic motor unit 160b, respectively, via a hydraulic circuit (a pair of first hydraulic lines 501a and a pair of second hydraulic lines 501b in this embodiment).

At least one of the first hydraulic pump body 30a and the first hydraulic motor unit 160a fluidly connected to each other is of a variable displacement type in which suction/discharge rates change by the operation of an output adjusting member, and a non-stepwise speed change output is obtained from the motor shaft of the first hydraulic motor unit 160a by controlling a slanting position of the output adjusting member.

Similarly, at least one of the second hydraulic pump body 30b and the second hydraulic motor unit 160b is of a variable displacement type in which suction/discharge rates changes by the operation of the output adjusting member, and a non-stepwise speed change output is obtained from the motor shaft of the second hydraulic motor unit 160b by controlling the slanting position of the output adjusting member.

In this embodiment, each of the hydraulic pump bodies 30a, 30b is of a variable displacement type and each of the hydraulic motor units 160a, 160b is of a fixed displacement type.

As clearly shown in FIGS. 3 and 4, the input shaft 10 is supported by the housing 40 so that an upstream end in the transmitting direction (rear end in this embodiment) extends outwardly (backward in this embodiment) from the housing 40 along the longitudinal direction of the vehicle, and is operatively connected to the driving source 150 via a flywheel 155.

Figure 1:
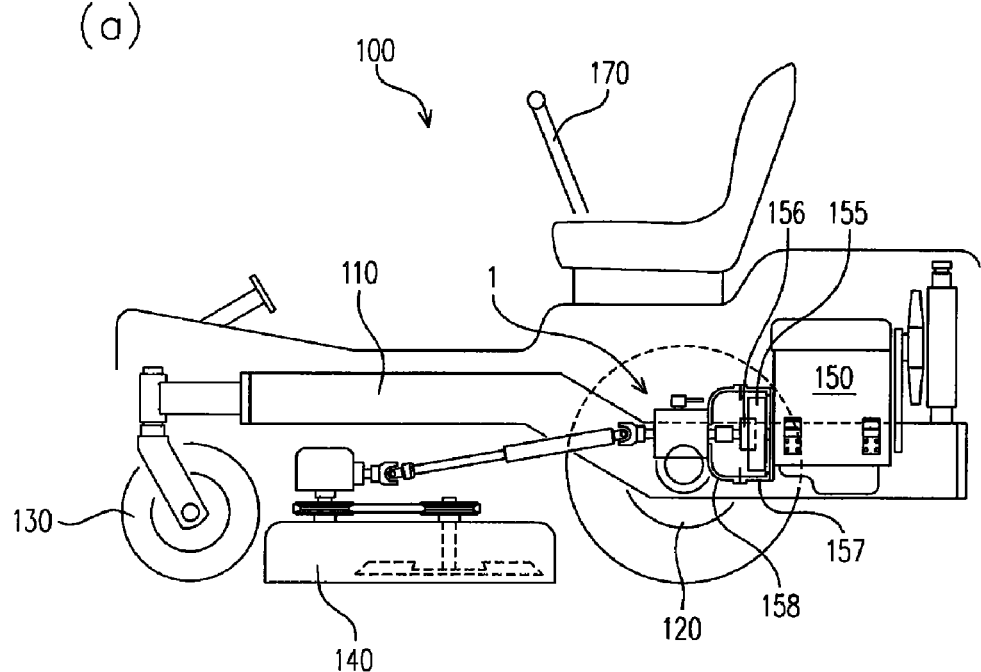
FIGS. 1(a) and 1(b) are a side view and a plan view of the working vehicle to which the pump unit according to a first embodiment of the present invention is applied, respectively.
Figure 1:
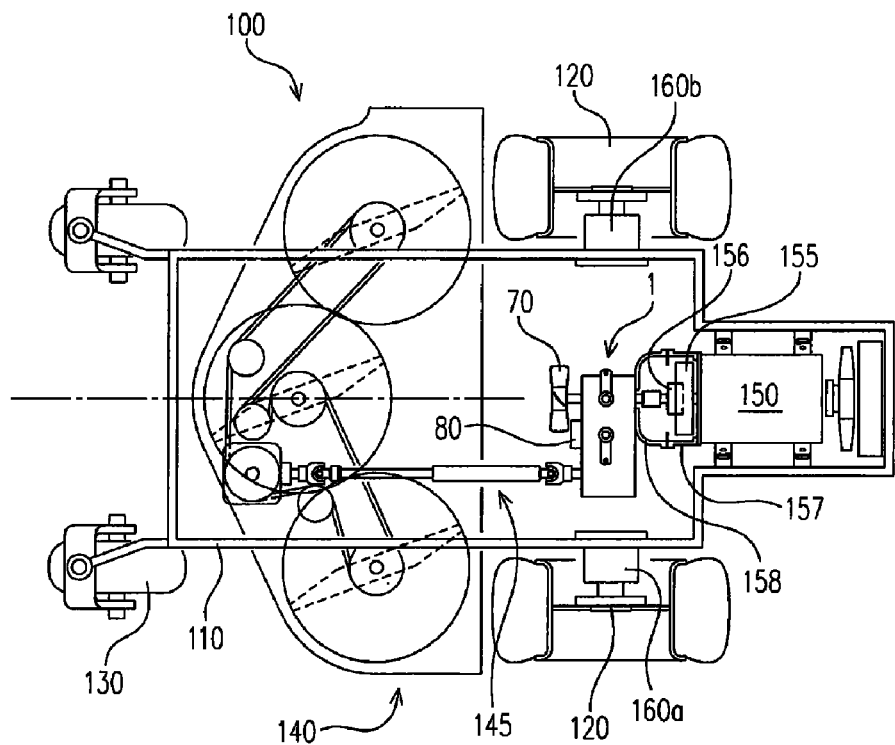

Preferably, the flywheel 155 may be provided with a damper 156 (see FIG. 1). With this configuration, power transmission can be performed from the driving source 150 to the input shaft 10 while suppressing the angular speed variation of the output shaft of the driving source 150. It is therefore possible to improve the durability of the hydraulic pump bodies 30a, 30b. Further, since the pulsation of the oil ejected from the hydraulic pump bodies 30a, 30b is suppressed, the durability of the hydraulic motor units 160a, 160b subjected to the oil pressure is also improved and the noise/vibration can be reduced.

In this embodiment, the input shaft 10 is integrally formed with the first pump shaft 20a by a single member.

That is, the input shaft 10 and the first pump shaft 20a are defined as a single shaft 15.

The first pump shaft 20a is supported by the housing 40 along the longitudinal direction of the vehicle.

Preferably, the first pump shaft 20a may be configured to have a first end which extends outwardly (forward in this embodiment) from the housing 40 to drive a member to be driven by the first end.

In this embodiment, a cooling fan 70 serving as the member to be driven is provided.

In this embodiment, as described above, the first pump shaft 20a is integrally formed with the input shaft 10 and is defined as the single shaft 15.

According to the embodiment, the upstream side in the transmitting direction of the single shaft 15 configures the input shaft 10, and the downstream side of the transmitting direction configures the first pump shaft 20a.

In this embodiment, the single shaft 15 is extended outwardly from the housing 40 so that its rear end and the front end form a connection portion to the driving source 150 and a support portion of the cooling fan 70, respectively.

The second pump shaft 20b is also supported by the housing 40 along the longitudinal direction of the vehicle.

Preferably, the second pump shaft 20b may be configured to have a first end which extends outwardly from the housing 40 to drive a member to be driven by the first end.

In this embodiment, a charge pump 80 serving as the member to be driven is provided.

The charge pump 80 includes a charge pump body 81 driven by the outwardly extended end of the second pump shaft 20b, and a charge pump case 82 for surrounding the charge pump body 81.

The first and second pump shafts 20a, 20b are operatively connected to the input shaft 10, as described above.

More specifically, the pump unit 1 according to this embodiment includes a power transmission mechanism 75 for transmitting the rotational power of the input shaft 10 to the first and second pump shafts 20a, 20b.

In this embodiment, the first pump shaft 20a is integrally formed with the input shaft 10 by the single shaft 15, as described above.

Therefore, the pump unit 1 according to this embodiment comprises, as the power transmission mechanism 75, a driving gear 76 supported in a non-rotatable manner relative to the single shaft 15, and a driven gear 77 supported in a non-rotatable manner relative to the second pump shaft 20b so as to mesh with the driving gear 76.

The driving gear 76 and the driven gear 77 have a same pitch diameter; thus, the first pump shaft 20a (single shaft 15) and the second pump shaft 20b rotate in synchronization.

In this embodiment, the input shaft 10 is integrally formed with the first pump shaft 20a; however, the input shaft 10 and the first pump shaft 20a may of course be separately provided.

The first hydraulic pump body 30a includes a cylinder block 31a which rotates about an axis line of the first pump shaft 20a along with the rotation of the first pump shaft 20a, a piston unit 32a which rotates about the axis line of the first pump shaft 20a along with the rotation of the cylinder block 31a and, also, is slidable in the axis line direction of the first pump shaft 20a with respect to the cylinder block 31a, and an output adjusting member 33a (combination of movable swash plate 34a and an operating shaft 35a) which regulates the stroke length of the piston unit depending on the slanting position and changes oil suction/discharge rates by the cylinder block 31a.

The second hydraulic pump body 30b has substantially the same configuration as the first hydraulic pump body 30a except that the second hydraulic pump body 30b is driven by the second pump shaft 20b. Therefore, in the figure, similar reference characters with a different subscript are denoted for the members same as or corresponding to those of the first hydraulic pump body 30a, and the description of the second hydraulic pump body 30b will not be given herein.

In this embodiment, each of the hydraulic pump bodies 30a, 30b is of an axial piston type, but may also be of a radial piston type.

As clearly shown in FIG. 3, the PTO device 50 has a PTO shaft 51 for outputting the power toward the ground working machine 140.

The PTO shaft 51 is supported by the housing 40 along the longitudinal direction of the vehicle while being operatively connected to the input shaft 10.

The PTO shaft 51 is supported by the housing 40 so that a first end thereof extends outwardly. In this embodiment, the PTO shaft 51 has the front end thereof extending forward in the longitudinal direction of the vehicle.

The outwardly extended end of the PTO shaft 51 is operatively connected to an input part of the ground working machine via a vibration absorbing-type transmission means 145. In this embodiment, as shown in FIG. 1, a transmission shaft having universal joints on both ends serves as the vibration absorbing-type transmission means 145.

Preferably, the PTO device 50 may include a hydraulic clutch 55 for selectively engaging/releasing the power transmission from the input shaft 10 to the PTO shaft 51.

In this embodiment, as clearly shown in FIG. 3, the hydraulic clutch 55 includes a driving-side member 55a supported in a rotatable manner relative to the PTO shaft 51 and in a non-slidable manner in the axial direction, the driving-side member 55a being operatively connected to the input shaft 10, a driving-side friction plate 55b supported in a non-rotatable manner relative to the driving-side member 55a and in a slidable manner in the axial direction, a driven-side member 55c supported in a non-rotatable manner relative to the PTO shaft 51, a driven-side friction plate 55d supported in a non-rotatable manner relative to the driven-side member 55c and in a slidable manner within a certain range in the axial direction, a clutch pushing member 55e for friction-engaging the driven-side friction plate 55d with the driving-side friction plate 55b by the action of the oil pressure, and a clutch biasing member 55f for separating the clutch pushing member 55e from the driving-side friction plate 55b and the driven-side friction plate 55d.

The hydraulic clutch 55 of the above configuration transmits power from the input shaft 10 to the PTO shaft 51 via the driving-side member 55a and the driven-side member 55c when the clutch pushing member 55e friction-engages both friction plates 55b, 55d with each other by the action of the oil pressure, and blocks the power transmission from the input shaft 10 to the PTO shaft 51 when not subjected to the action of the oil pressure.

In this embodiment, the driving-side member 55a is operatively connected to the input shaft 10 via the power transmission mechanism 75.

More specifically, the driving-side member 55a is configured so as to mesh with the driven gear 77.

More preferably, the PTO device 50 may include a hydraulic brake 58 cooperatively operating with the clutch operation of the hydraulic clutch 55, and thus effectively prevents the PTO shaft 51 from continuously rotating by the inertia force of the connected ground working machine 140 when the hydraulic clutch 55 blocks the power.

In this embodiment, the hydraulic brake 58 includes a brake pushing member 58a connected to the clutch pushing member 55e via a connecting rod 56 so as to cooperatively operate with the clutch pushing member 55e, a fixed disk 58b supported in a non-rotatable manner relative to the housing 40, and a brake disk 58c supported in a non-rotatable manner relative to the PTO shaft 51 while facing the fixed disk 58c.

The brake pushing member 58a pushes the brake disk 58c toward the fixed disk 58b when the clutch pushing member 55e is separated from the driving-side friction plate 55b and the driven-side friction plate 55d.

The housing 40 is configured so as to contain the first and second hydraulic pump bodies 30a, 30b and the PTO device 50.

More specifically, the housing 40 includes a housing body 41 having a pump accommodating section 42 capable of containing therein the first and second hydraulic pump bodies 30a, 30b.

The pump accommodating section 42 is arranged on one side in the width direction of the housing body 41 of the vehicle, and is communicated outwardly via a first opening 42a into which the first and second hydraulic pump bodies 30a, 30b can be inserted.

The housing body 41 has, in addition to the pump accommodating section 42, a PTO accommodating section 43 capable of containing therein the PTO device 50.

The PTO accommodating section 43 is arranged on the other side in the width direction of the housing body 41 of the vehicle, and is communicated outwardly via a second opening 43a into which the PTO device 50 can be inserted.

More specifically, the housing body 41 has first and second end walls 41a, 41b positioned on both sides (forward and backward in this embodiment) in the longitudinal direction of the vehicle, and a peripheral wall 41c extending between the peripheral edges of the first and second end walls 41a, 41b.

That is, the housing body 41 is configured so that, of the inner space defined by the first end wall 41a, the second end wall 41b and the peripheral wall 41c, one side in the width direction of the vehicle forms the pump accommodating section 42 and the other side in the width direction of the vehicle forms the PTO accommodating section 43.

In the above configuration, the first opening 42a is formed in the first end wall 41a so as to correspond to the pump accommodating section 42, and the second opening 43a is formed in the second end wall 41b so as to correspond to the PTO accommodating section 43.

The housing 40 has, in addition to the housing body 41, a center section 45 connected to the first end wall 41a of the housing body 41 so as to liquid-tightly close the first opening 42a, and a lid member 47 connected to the second end wall 41b of the housing body 41 so as to liquid-tightly close the second opening 43a.

The center section 45 is connected to the housing body 41 so as to block the first opening 42a with the first and second hydraulic pump bodies 30a, 30b sandwiched with the second end wall 41b of the housing body 41.

The housing 40 also has a concave arc-shaped swash plate holder 49 on the side facing against the inner surface of the center section 45 in the second end wall 41b of the housing body 41.

That is, the center section 45 is configured so as to sandwich the first and second hydraulic pump bodies 30a, 30b with the swash plate holder 49.

The swash plate holder 49 may be integrally formed with the second end wall 41b, but in this embodiment, is removably connected to the housing body 41 so as to be positioned within the pump accommodating section 42.

In this embodiment, the swash plate holder 49 is provided separately from the housing body 41; thus, allowing the swash guide surface required for machining accuracy to be easily formed.

The center section 45 further has a part of an oil path for fluidly connecting the first and second hydraulic pump bodies 30a, 30b to the first and second hydraulic motor units 160a, 160b.

The oil path of the center section will be described later.

The lid member 47 is configured so as to block the second opening 43a while forming an accommodating space between the lid member 47 and the second end wall 41b of the case body 41.

The power transmission mechanism 75 is contained in the accommodating space defined between the lid member 47 and the second end wall 41b.

In the working vehicle 100, the housing 40 is integrally connected to the driving source 150 in a free state with respect to the body frame 110, as shown in FIG. 1.

More specifically, the housing 40 is connected to the driving source 150 via a flywheel cover and a mount member 158 integrally connected to the driving source 150.

When the housing 40 is integrally connected to the driving source 150 in a free state with respect to the body frame 110, the relative vibration of the housing 40 with respect to the driving source 150 can be prevented.

Therefore, the power transmission from the driving source 150 to the input shaft 10 can be reliably carried out.

Preferably, in the working vehicle 100, the output adjusting member 33a and the operating means 170 (see FIG. 1) arranged in the vicinity of the driver's seat can be connected by a vibration absorbing-type mechanical link mechanism or an electrical controlling means through an electrical signal, thereby effectively preventing the vibration propagation to the operating means.

Herein, description will be given of the hydraulic circuit in the pump unit 1.

Figure 6:
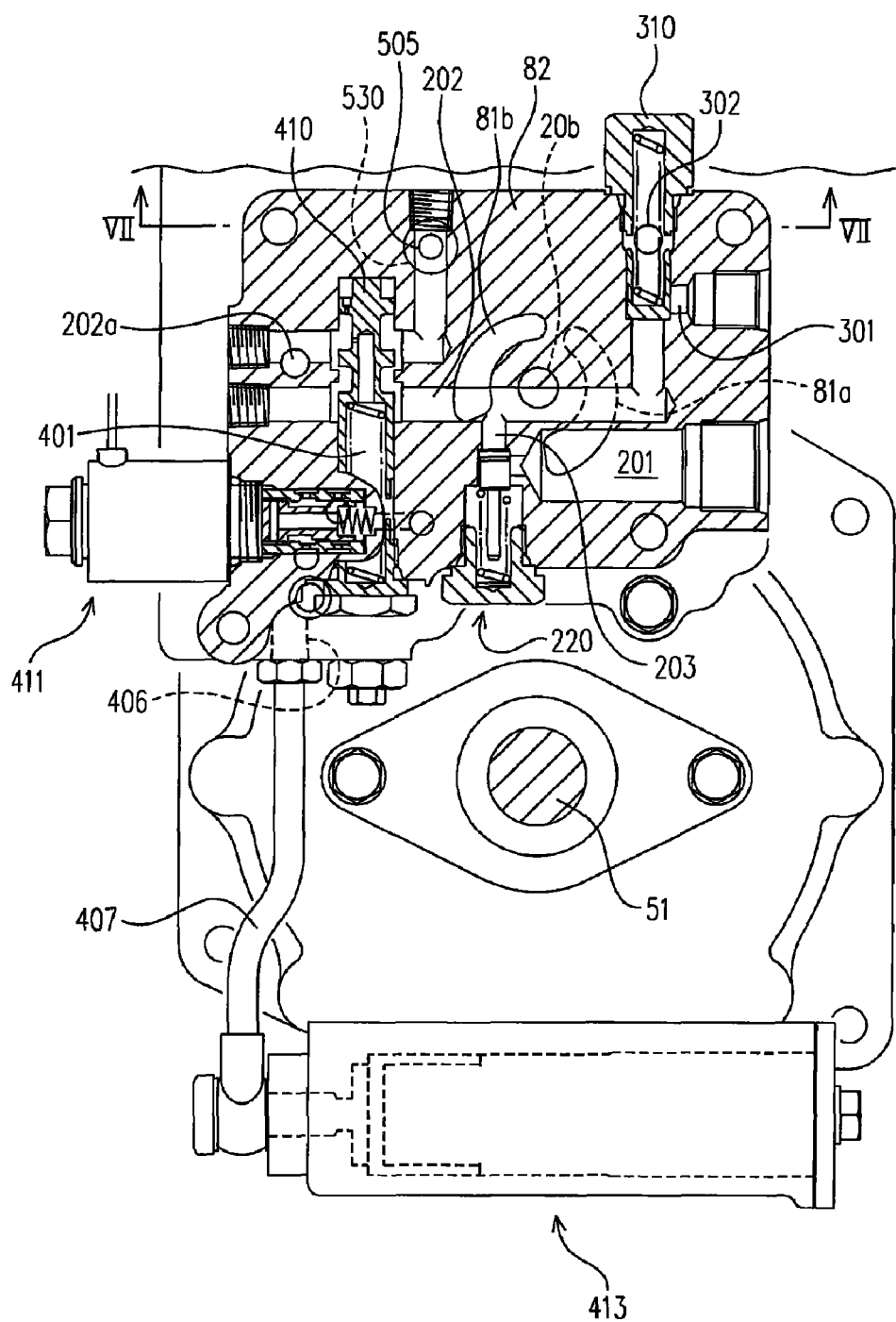
FIG. 6 is a cross sectional view taken along line VI-VI in FIG. 3.
Figure 7:
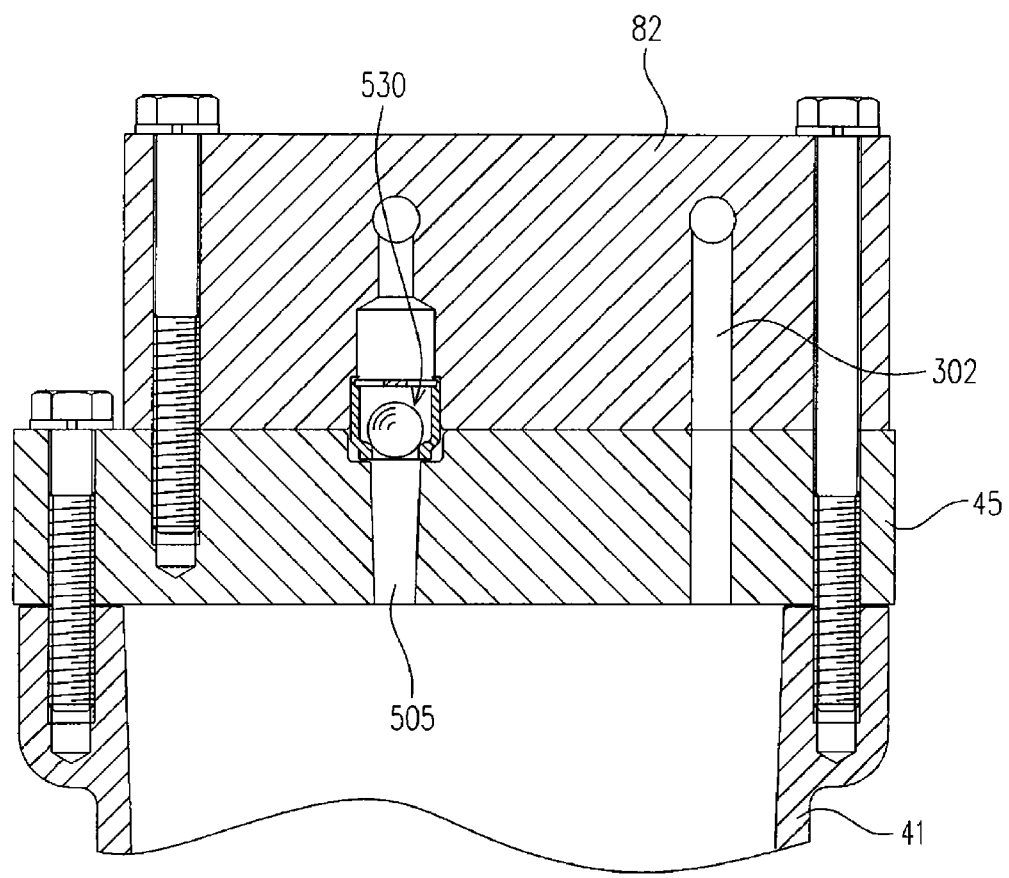
FIG. 7 is a cross sectional view taken along line VII-VII in FIG. 6.

FIG. 6 shows a cross sectional view taken along line VI-VI in FIG. 3. Further, FIG. 7 shows a cross sectional view taken along line VII-VII in FIG. 6.

As shown in FIG. 6, the charge pump case 82 is provided with a suction oil path 201 having a first end communicated with a suction port 81a of the charge pump body 81 and a second end opened outwardly, and a discharge oil path 202 having a first end communicated with a discharge port 81b of the charge pump body 81 and a second end branch-connected to various hydraulic circuit.

As shown in FIG. 2, the second end of the suction oil path 201 is connected to an optionally provided reservoir tank 250 via the oil path 211 such as a conduit into which a filter 210 is inserted.

The discharge oil path 202 is branched into a working machine operating hydraulic circuit 300, a PTO hydraulic circuit 400 and a traveling-system hydraulic circuit 500 while being set to a predetermined pressure by a relief valve 220.

The relief oil from the relief valve 220 is returned to the suction oil path 201 via the return oil path 203 arranged in the charge pump case 82 (see FIGS. 2 and 6).

The working machine operating hydraulic circuit 300 has a working machine operating oil path 301 for supplying pressure oil from the charge pump 80 toward the working machine such as a mower lifting device.

The working machine operating oil path 301 is connected to the discharge oil path 202 via a sequence 310.

In this embodiment, the working machine operating oil path 301 is formed on the charge pump case 82 so as to have a first end communicated with the discharge oil path 202 and a second end opened to the exterior surface, as shown in FIG. 6. The path is opened to the exterior surface of the charge pump case (see FIGS. 2 and 6).

As shown in FIGS. 2 and 7, a spring chamber of the sequence 310 is opened into the housing through an oil path 302 formed in the charge pump case and the center section.

The PTO hydraulic circuit 400 is configured so as to supply a part of the pressure oil of the discharge oil path 202 to the PTO device 50.

Figure 8:
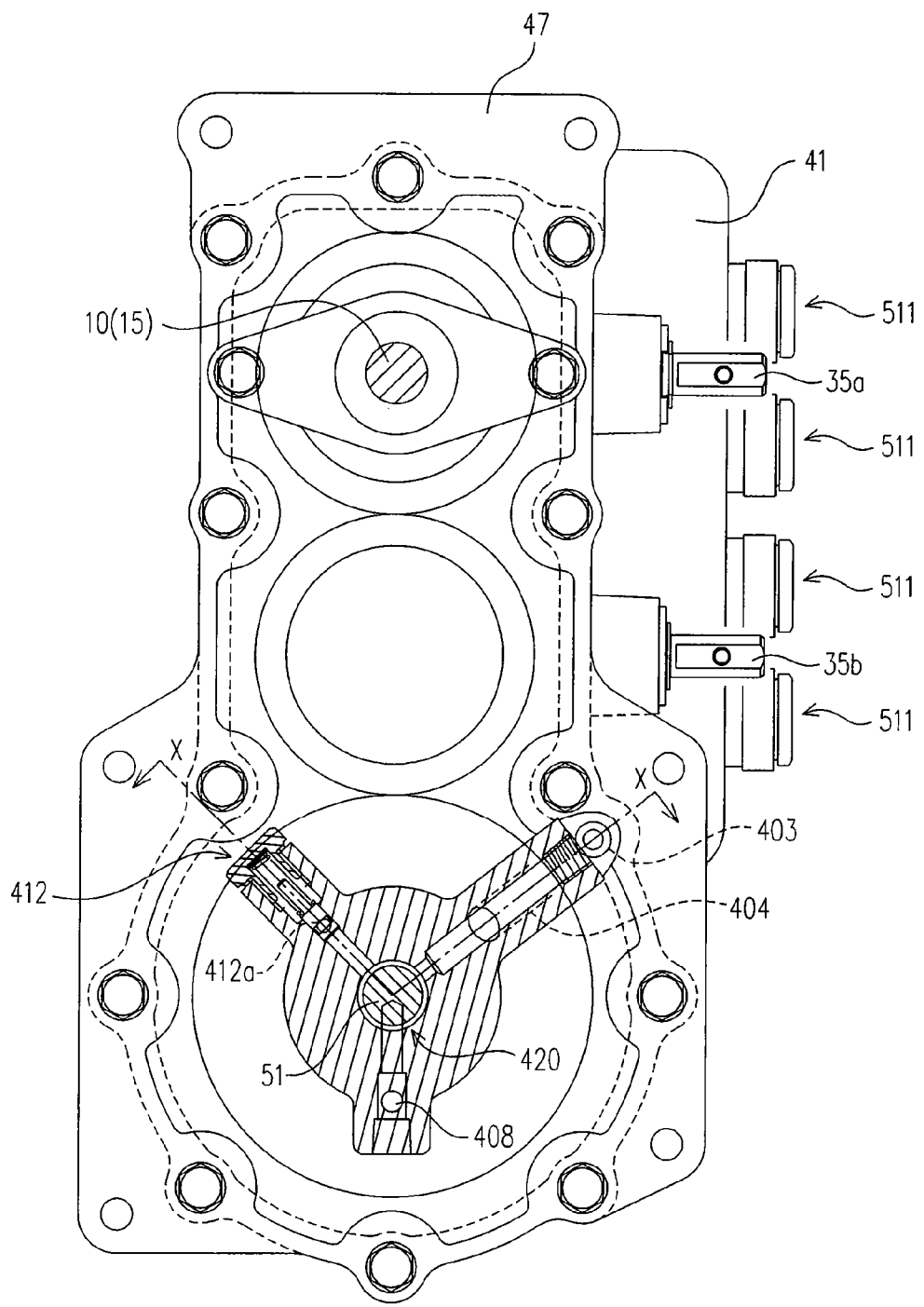
FIG. 8 is a cross sectional view taken along line VIII-VIII in FIG. 3.
Figure 9:
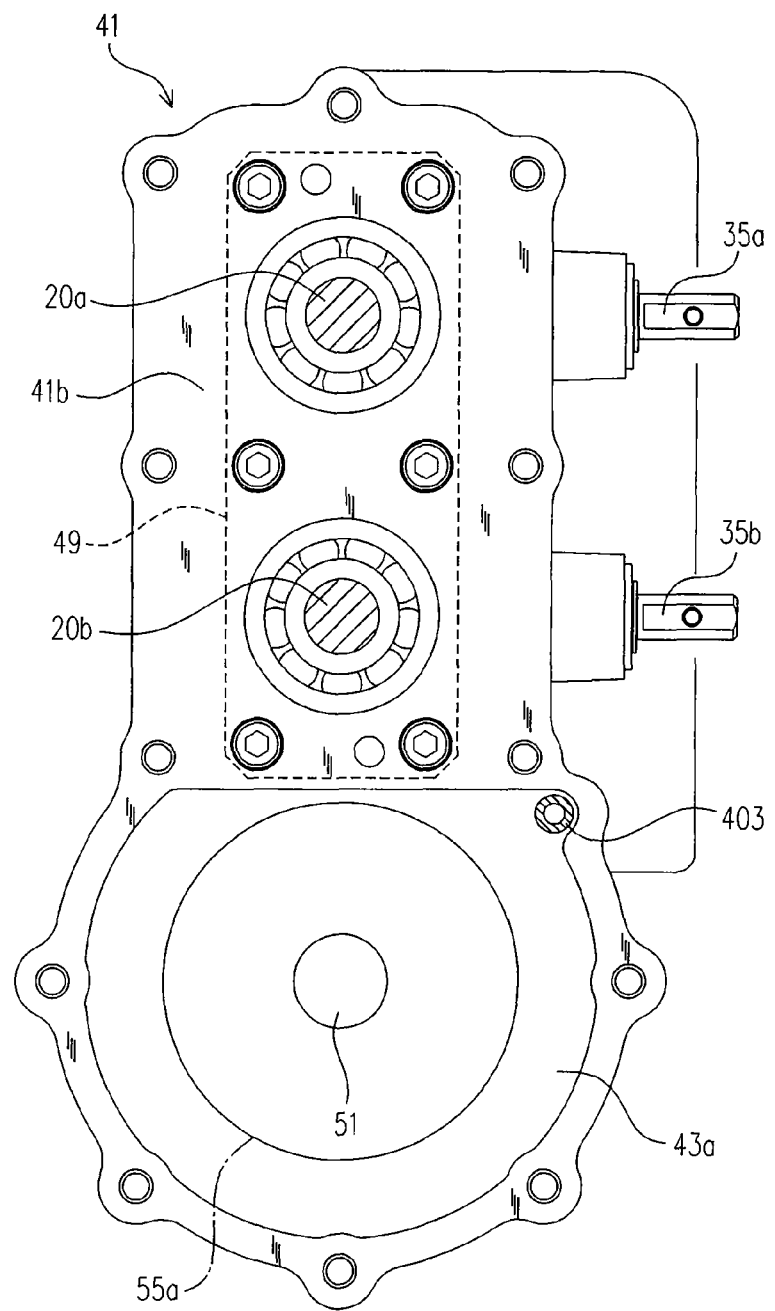
FIG. 9 is a cross sectional view taken along line IX-IX in FIG. 3.

FIGS. 8 and 9 show cross sectional views taken along line VIII-VIII and line IX-IX in FIG. 3, respectively.

Figure 10:
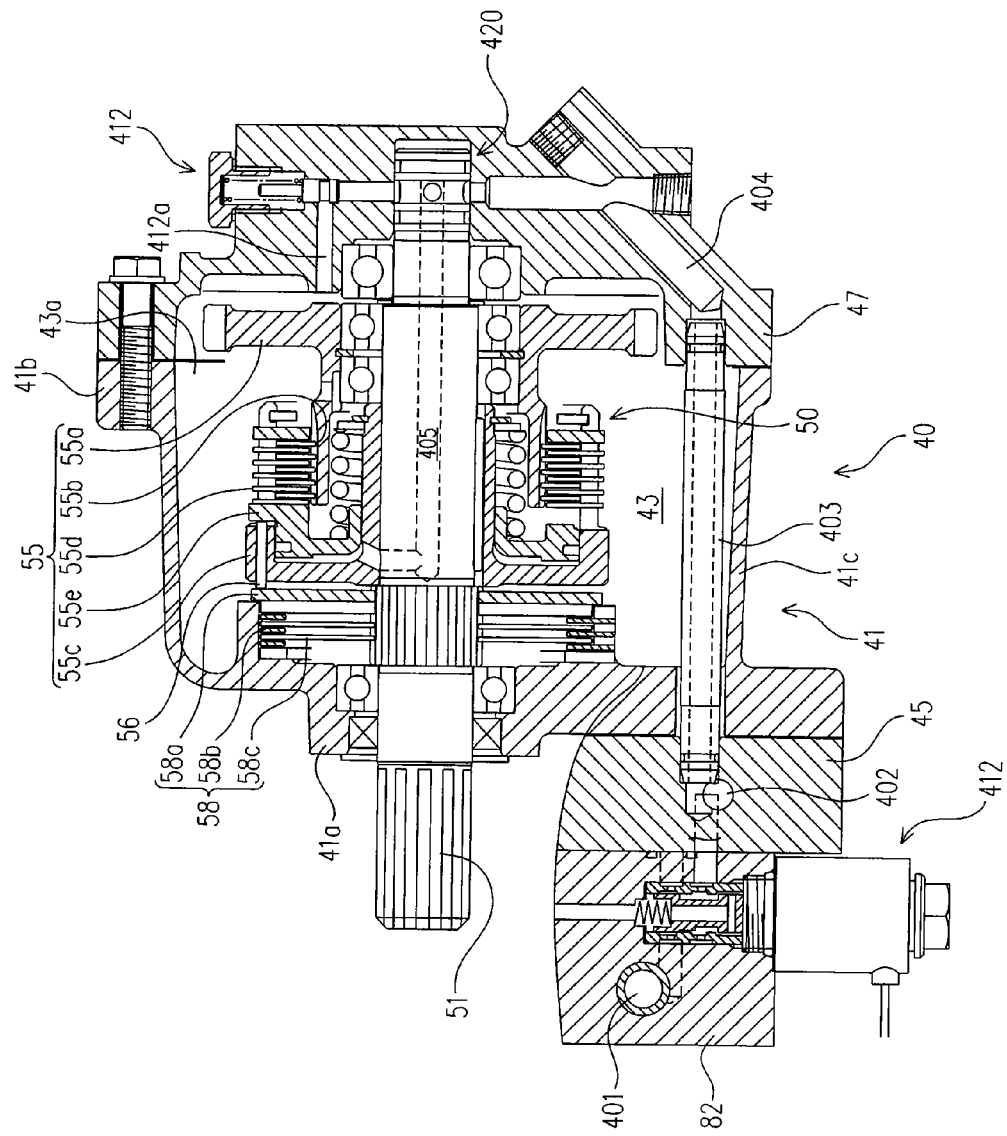
FIG. 10 is a cross sectional view taken along line X-X in FIG. 8.

FIG. 10 shows a cross sectional view taken along line X-X in FIG. 8.

As shown in FIGS. 2, 6 and 10, in this embodiment, the PTO hydraulic circuit 400 includes a first PTO oil path 401 formed in the charge pump case 82 so as to have a first end connected to the discharge oil path 202 via a depressurizing valve 410 and a second end opened to the contacting surface with the center section 45 of the charge pump case 82, a second PTO oil path 402 formed in the center section 45 so as to communicate with the second end of the first PTO oil path 401, a third PTO oil path 403 arranged within the housing body 41 so as to have a first end connected to the second PTO oil path 402 and a second end extending to the lid member 47, and a fourth PTO oil path 404 formed in the lid member 47 so as to communicate to the second end of the third PTO oil path 403.

As shown in FIG. 10, in this embodiment, a conduit extending between the center section 45 and the lid member 47 is used as the third PTO oil path 403, but an oil path may of course be formed in the peripheral wall 41c of the housing body 41 in place of the conduit.

The PTO hydraulic circuit 400 further has a clutch operating oil path 405 perforated in the PTO shaft 51 so as to communicate with the fourth PTO oil path 404.

More specifically, the PTO shaft 51 is supported so as to be rotatable about the axis line by the first end wall of the housing body 41 and the lid member 47, as shown in FIG. 10.

Further, a seal case part 420 including a ring-shaped oil distributing chamber is formed at the support portion of the lid member 47 and the PTO shaft 51 to communicate the fourth PTO oil path 404 with the clutch operating oil path 405.

In this embodiment, the lid member 47 is provided with a drain oil path 408 having a first end communicated with the seal case part 420 and a second end opened into the housing 40 (see FIG. 8); thus, preventing the leakage oil leaking in the seal case part 420 from acting as a back pressure of the PTO shaft 51.

As shown in FIG. 2, the PTO hydraulic circuit 400 further has a PTO solenoid valve 411, a PTO relief valve 412 and an accumulator 413 in the oil path extending from the discharge oil path 202 to the PTO device 50.

The PTO solenoid valve 411 is provided to selectively supply/block the pressure oil from the charge pump 80 to the hydraulic clutch 55 in the PTO device 50.

In this embodiment, the PTO solenoid valve 411 is arranged in the charge pump case 82 so as to be inserted into the first PTO oil path 401, as shown in FIG. 6.

The PTO relief valve 412 is provided to set the pressure oil supplied to the hydraulic clutch 55 through the clutch operating oil path 405 to a predetermined oil pressure.

In this embodiment, the PTO relief valve 412 is arranged in the lid member 47 so as to be inserted into the fourth PTO oil path 404, as shown in FIG. 10.

The drain oil from the PTO relief valve 412 is returned into the housing 41 via the drain oil path 412a formed in the lid member 47 (see FIGS. 2, 8, 10).

The accumulator 413 is provided to gradually increase the oil pressure of the clutch operating oil path 405 to the predetermined oil pressure set by the PTO relief valve 412.

Figure 11:
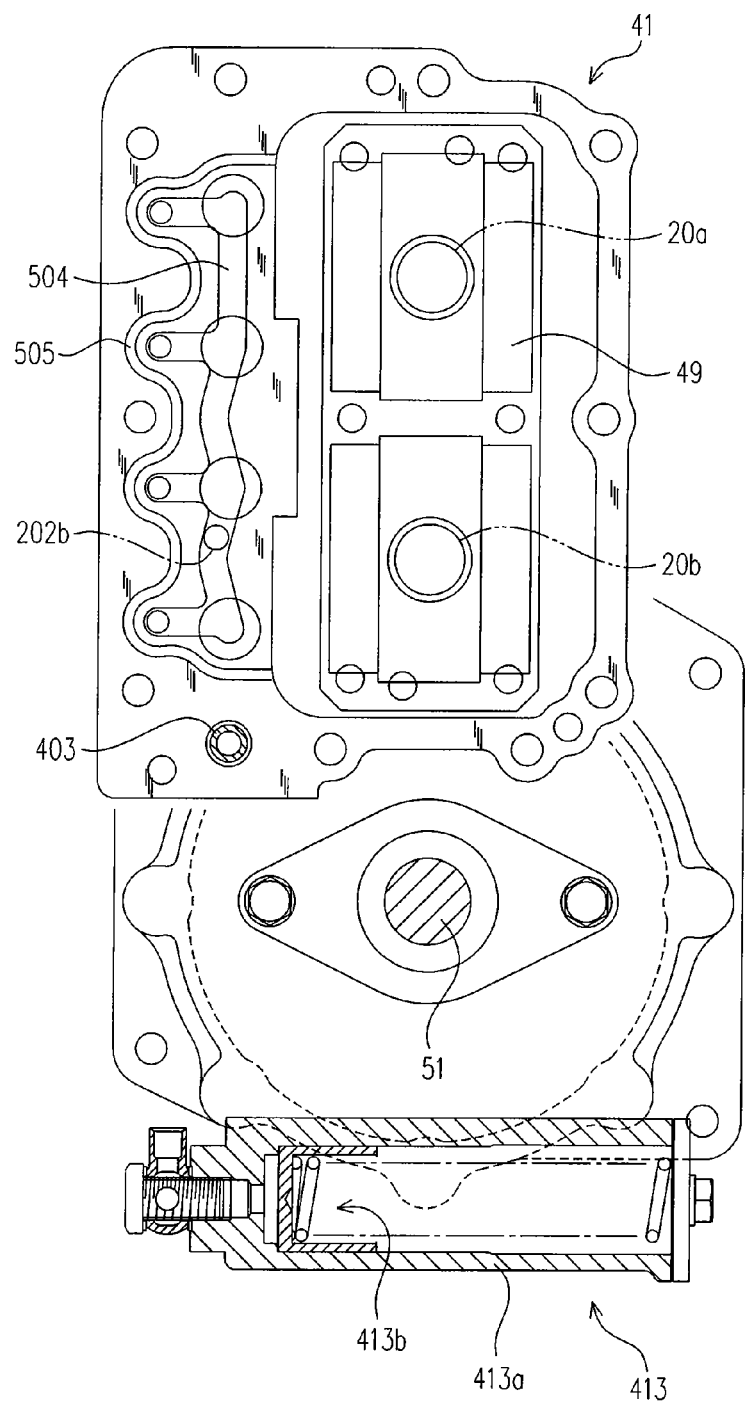
FIG. 11 is an end view taken along line XI-XI in FIG. 3 and shows an end view with the first and second hydraulic pump bodies removed.

FIG. 11 is an end view taken along line XI-XI in FIG. 3 and is an end view with the first and second hydraulic pump bodies 30a, 30b removed.

Figure 12:
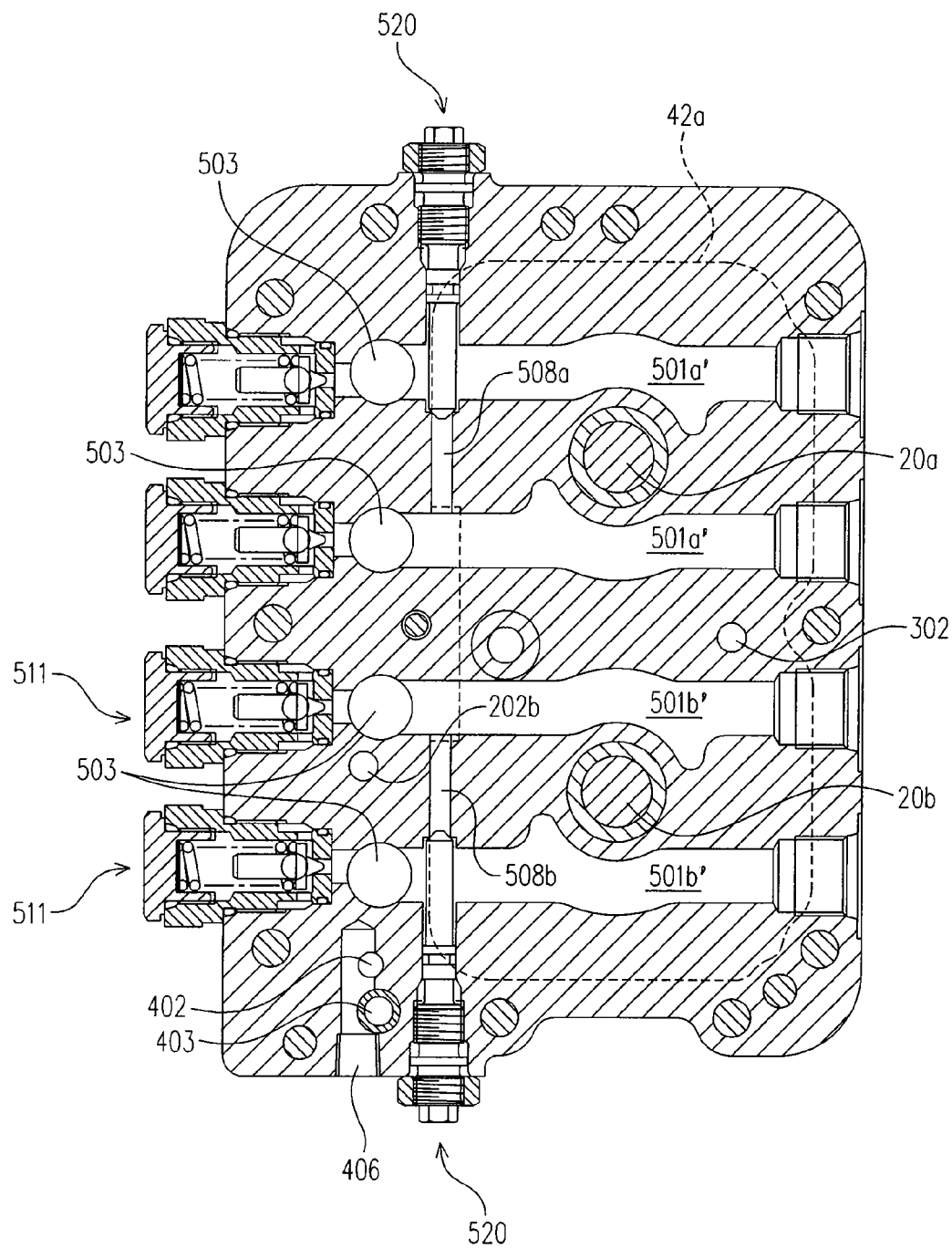
FIG. 12 is a cross sectional view taken along line XII-XII in FIG. 3.

FIG. 12 is a cross sectional view taken along line XII-XII in FIG. 3.

As shown in FIGS. 3 and 11, in this embodiment, the accumulator 413 includes an accumulator case 413a provided to the housing body 41, and an accumulator body 413b internally inserted into the accumulator case 413a.

More specifically, an accumulator oil path 406, which has a first end communicated with the second PTO oil path 402 and a second end opened to the exterior surface of the center section 45, is formed in the center section 45 (see FIGS. 2 and 12).

The second end of the accumulator oil path 406 and the accumulator 413 are communicated with each other by an appropriate conduit 407 (see FIG. 2).

In this embodiment, as described above, the accumulator case 413a is provided to the housing body 41, but of course, the accumulator body 413b may be inserted into the housing body 41, the charge pump case 82 or the center section 45, thus eliminating the accumulator case 413a. Further, an oil path substituting the conduit 47 can be perforated in the housing body 41.

In this embodiment, as shown in FIGS. 3 and 11, the accumulator 413 is provided to the housing body 41, and the PTO relief valve 412 is provided to the lid member 47, but in place thereof, both may be integrally provided.

Figure 13:
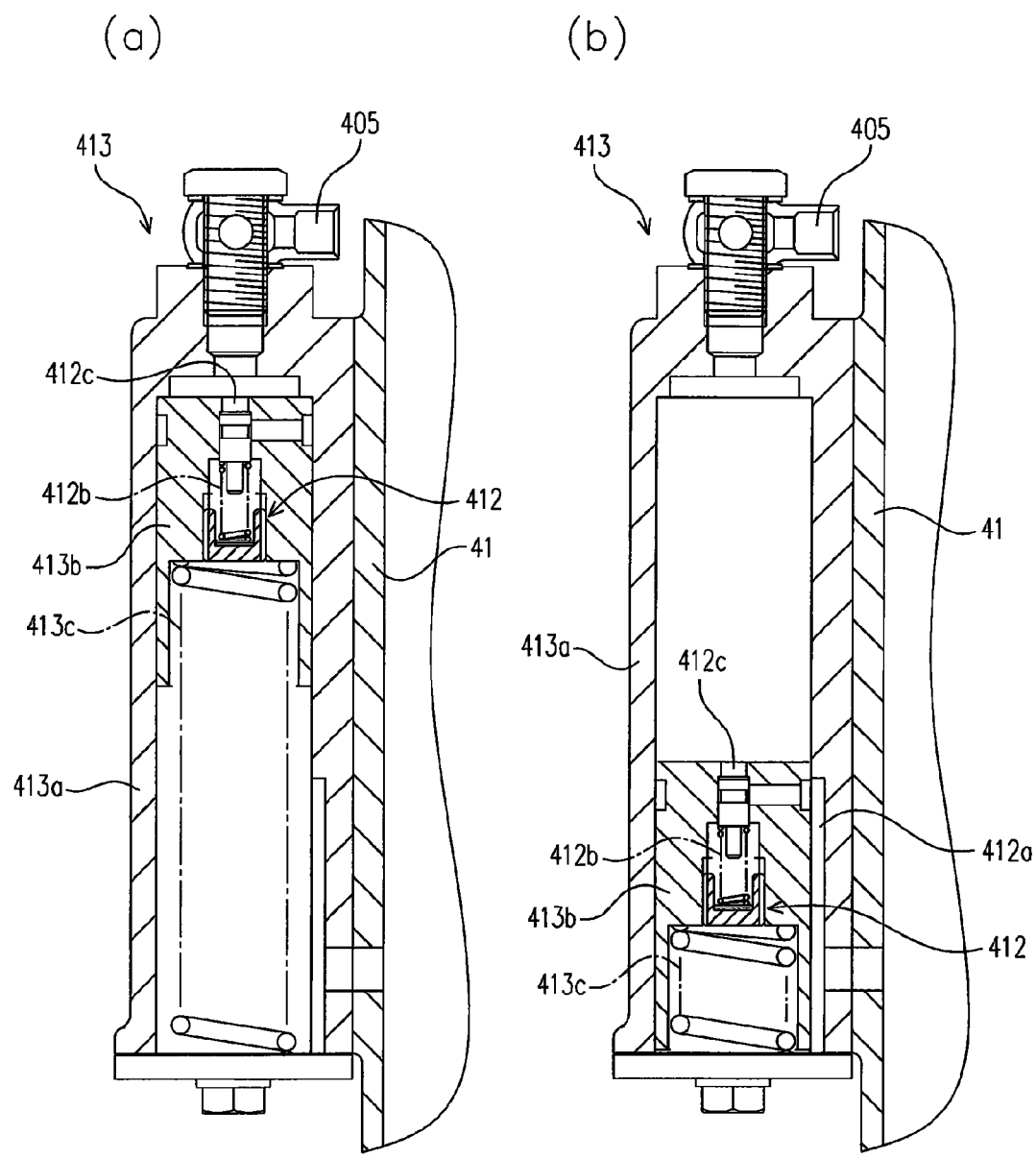
FIG. 13 is a cross sectional view of a modified pump unit according to the present invention.

For example, as shown in FIG. 13, the PTO relief valve 412 may be inserted into the accumulator case 413 provided to the housing body 41.

With the above configuration, the machining step for installing the PTO relief valve 412 to the lid member 47 can be eliminated, thus reducing the machining cost of the lid member 47.

Herein, description will be given of a configuration of a case in which the accumulator 413 and the PTO relief valve 412 are integrally formed.

As shown in FIG. 13, the PTO relief valve 412 is arranged in the accumulator body 413b so that the pressure receiving chamber 412c opens to the pressure receiving surface of the accumulator body 413b. The relief setting spring 412b of the PTO relief valve 412 is set so that the biasing force thereof is greater than that of the spring 413c of the accumulator 413.

Therefore, when the oil pressure is introduced into the clutch operating oil path 405, the accumulator body 413b moves from an initial position shown in FIG. 13(a) to a stroke end (see FIG. 13(b)) against the spring 413c in the accumulator case 413, thereby obtaining the effect of gradual increase of the oil pressure.

When the oil pressure of the clutch operating oil path 405 further rises, the oil pressure acts on the pressure receiving chamber 412c of the PTO relief valve 412 opened to the pressure receiving surface of the accumulator body 413b. When the oil pressure exceeds the biasing force of the relief setting spring 412b, the relief operation is carried out, and the drain oil is discharged from the accumulator body 413b to an oil sump within the housing body 41 through the drain oil path 412a formed in the accumulator case 413a.

Next, description will be given of the traveling-system hydraulic circuit.

FIG. 12 shows a cross sectional view taken along line XII-XII in FIG. 3.

As shown in FIG. 2, the traveling-system hydraulic circuit 500 includes a first hydraulic circuit 500a for fluidly connecting the first hydraulic pump body 30a to the first hydraulic motor unit 160a, and a second hydraulic circuit 500b for fluidly connecting the second hydraulic pump body 30b to the second hydraulic motor unit 160b.

The first hydraulic circuit 500a and the second hydraulic circuit 500b have substantially the same configuration. Therefore, in the figure, same reference characters (or same reference character with a different subscript) are denoted for the members same as or corresponding to the first hydraulic circuit 500a and the detailed description of the second hydraulic circuit 500b will not be given herein.

The first hydraulic circuit 500a connects the first hydraulic pump body 30a to the first hydraulic motor unit 160a so as to configure a closed circuit.

In this embodiment, the first hydraulic circuit 500a has a pair of first hydraulic lines 501a for connecting the first hydraulic pump body 30a to the first hydraulic motor unit 160a, and a charge line 502a for communicating between the pair of first hydraulic lines 501a.

One of the pair of first hydraulic lines 501a communicates the discharge port in the first hydraulic pump body 30a with the suction port in the first hydraulic motor unit 160a, and the other of the pair of the first hydraulic line 501a communicates the suction port of the first hydraulic pump body 30a with the discharge port in the first hydraulic motor unit 160a.

In this embodiment, as shown in FIG. 12, a pair of first oil paths 501a' forming a part of the pair of first hydraulic line 501 is formed in the center section 45.

One of the pair of first oil paths 501a' has a first end communicated with the discharge port of the first hydraulic pump body 30a and a second end opened to the exterior surface of the center section 45.

Similarly, the other of the pair of the first oil path lines 501a' has a first end communicated with the suction port of the first hydraulic pump body 30a and a second end opened to the exterior surface of the center section 45.

The charge line 502a is configured to supply the pressure oil from the charge pump 80 to each of the pair of first hydraulic lines 501a.

In this embodiment, the charge line 502a is formed at the center section 45 and the housing body 41.

More specifically, as shown in FIGS. 11 and 12, the charge line 502a has a pair of charge oil paths 503 formed in the center section 45 so as to have a first end communicated with each of the pair of first oil paths 501a' and a second end opened to the contacting surface with the housing body 41 in the center section 45, and a communication groove 504 formed on the contacting surface with the center section 45 of the first end wall 41a in the housing body 41 so as to communicate the second ends of the pair of charge oil paths 503.

The discharge oil path 202 is connected to the communication groove 504.

More specifically, as shown in FIGS. 6 and 7, the discharge oil path 202 has a first portion 202a formed in the charge pump case 82, and a second portion 202b formed in the center section 45 so as to communicate with the first portion 202a and open to the communication groove 504.

Reference numeral 505 in FIG. 11 denotes a drain groove formed on the contacting surface with the center section 45 in the first end wall 41a so as to surround the opening ends of the pair of charge oil paths 503 and the communication groove 504 in order to return the leakage oil, generated when flowing oil from the discharge oil path 202 to the charge line 502a, into the housing 40.

The charge line 502a further has a pair of check valves 510 arranged between the communication groove 504 and the pair of charge oil paths 503, respectively, as shown in FIGS. 2, 4, 5 and 12.

The pair of check valves 510 are provided to allow the flow of oil from the discharge oil path 202 to each of the pair of first oil path 501a', and to prevent the oil from flowing in the reverse direction.

In this embodiment, as shown in FIGS. 3 and 4, the check valve 510 is arranged on the mating surface of the center section 45 and the housing body 41.

Further, the charge line 502a may have a high-pressure relief valve 511 for setting the maximum oil pressure of each of the pair of first hydraulic lines 501a (or the pair of first oil paths 501a').

By providing the high-pressure relief valve 511, the pair of first hydraulic lines 501a can be effectively prevented from becoming excessively high pressure.

In this embodiment, as shown in FIGS. 3 and 4, each of the pair of high-pressure relief valves 511 are arranged between the communication groove 504 and the pair of first oil paths 501a'.

That is, in this embodiment, when the oil pressure of the pair of first oil path 501a' becomes excessively high, the relief oil from the pair of first oil path 501a' is discharged to the communication groove 504 via the corresponding high-pressure relief valve 511.

Preferably, as shown in FIGS. 2, 4 and 5, the charge line 502a may have an orifice 512 for communicating at least one of the pair of first hydraulic lines 501a to the external line or externally.

By providing the orifice 512, a neutral state of the first hydraulic pump body 30a can be reliably achieved.

In this embodiment, the orifice 512 is arranged between one of the first oil paths 501a' (preferably, the first oil path 501a' that becomes high pressure when the vehicle moves backward) and the communication groove 504.

By providing the orifice 512 so that the first oil path 501a' that becomes high pressure when the vehicle moves backward communicates to the external line or externally, deterioration of transmission efficiency during the forward movement of the vehicle in which long driving time and high efficiency are required can be effectively prevented.

Preferably, the first hydraulic circuit 500a may include a bypass line 508a for communicating between the pair of first hydraulic lines 501a, and a bypass valve 520 inserted into the bypass line 508a so as to selectively communicate/block the bypass line 508a with the external operation.

With the above configuration, upon, for example, forcibly towing the vehicle, the pressure difference can be prevented from creating between the pair of first hydraulic lines 501a.

In this embodiment, as shown in FIG. 12, the bypass line 508a is formed in the center section 45 so as to communicate between the pair of first oil paths 501a'.

The traveling-system hydraulic circuit 500 further has a free wheel preventing check valve 530, as shown in FIG. 2.

The free wheel preventing check valve 530 is provided to naturally resupply the oil to the pair of first and second hydraulic lines 501a, 501b when the amount of oil within the pair of first hydraulic lines 501a and the pair of second hydraulic lines 501b decrease for some reason.

By providing the free wheel preventing check valve 530, when the vehicle is stopped at, for example, a hill without pulling the parking brake, the vehicle axle can be effectively prevented from rotating uncontrollably in spite of keeping the first and second hydraulic pump bodies 30a, 30b in the neutral state.

In this embodiment, as shown in FIGS. 6 and 7, a suction oil path 505, which has a first end communicated with the housing 40 and a second end communicated with the discharge oil path 202, is formed on the charge pump case 802 and the center section 45. The free wheel preventing check valve 530 is inserted into the suction oil path 505.

In the pump unit 1 of the above configuration, the following effects can be obtained in addition to the above-described various effects.

That is, as described above, the pump unit 1 configures a traveling-system transmission mechanism by being fluidly connected to the pair of hydraulic motor unit 160a, 160b allocated and arranged in the width direction of the vehicle.

Therefore, the pump unit 1 can effectively prevent the traveling-system transmission mechanism from being arranged at the central portion in the width direction of the body frame 110 of the vehicle.

Further, the pump unit 1 has the pump accommodating section 42 and the PTO accommodating section 43 allocated and arranged on one side and the other side in the width direction of the housing 40 of the vehicle, respectively, and has the input shaft 10 supported on one side in the width direction of the vehicle rather than the PTO shaft 51.

Normally, the driving source 150 is arranged at substantially the central portion in the width direction of the body frame 110 taking into consideration the vehicle balance (see FIG. 1(b)) and the like. Therefore, in order to perform the operative connection to the driving source 150 with a simple configuration, it is preferable to arrange the housing 40 so that the input shaft 10 is positioned at substantially the central portion in the width direction of the body frame 110.

The pump unit 1 according to this embodiment has the above configuration. Thus, if the housing 40 is arranged so that the input shaft 10 is positioned at substantially the central portion in the width direction of the body frame 110, the PTO shaft 51 is displaced to and arranged on the other side of the width direction of the body frame of the vehicle.

In this way, in the pump unit 1 according to this embodiment, positioning of both the traveling-system transmission mechanism and the PTO-system transmission mechanism at the central portion in the width direction of the body frame 110 can be effectively prevented, and a free space at the central portion in the width direction of the body frame 110 can be secured. Therefore, the degree of freedom in design of the working vehicle can be improved. Further, in the working vehicle equipped with the ground working machine 140 having the input part not at the center but displaced to one side in the width direction of the vehicle, the transmission path to the input part of the ground working machine 140 can be readily made short and, therefore, is very effective.

Further, in this embodiment, the input shaft 10 (or the single shaft 15) integrally formed with the first pump shaft 20a, the second pump shaft 20b and the PTO shaft 51 are arranged sequentially from one side to the other side in the width direction of the housing 40 of the vehicle.

Therefore, the power transmission from the input shaft 10 to the first pump shaft 20a, the second pump shaft 20b and the PTO shaft 51 can be carried out with a simple configuration while maintaining the distance between the axes of the input shaft 10 and the PTO shaft 51.

In this embodiment, as described above, the input shaft 10 and the first pump shaft 20a are integrally formed, but may also be formed with a separate shaft in which the relevant shafts are arranged concentrically.

In the case where the input shaft 10 and the first pump shaft 20a are formed with a separate shaft, the input shaft 10 is positioned so as to be closest to one side in the width direction of the housing 40 of the vehicle than any other shaft, and the PTO shaft 51 can be positioned so as to be closest to the other side in the width direction of the housing 40 of the vehicle than any other shaft.

Embodiment 2

Another embodiment of the pump unit according to the present invention will now be described with reference to the attached drawings.

FIGS. 14(a) and 14(b) are a side view and a plan view of a working vehicle 100B to which a pump unit 1B according to the present embodiment is applied, respectively.

Figure 15:
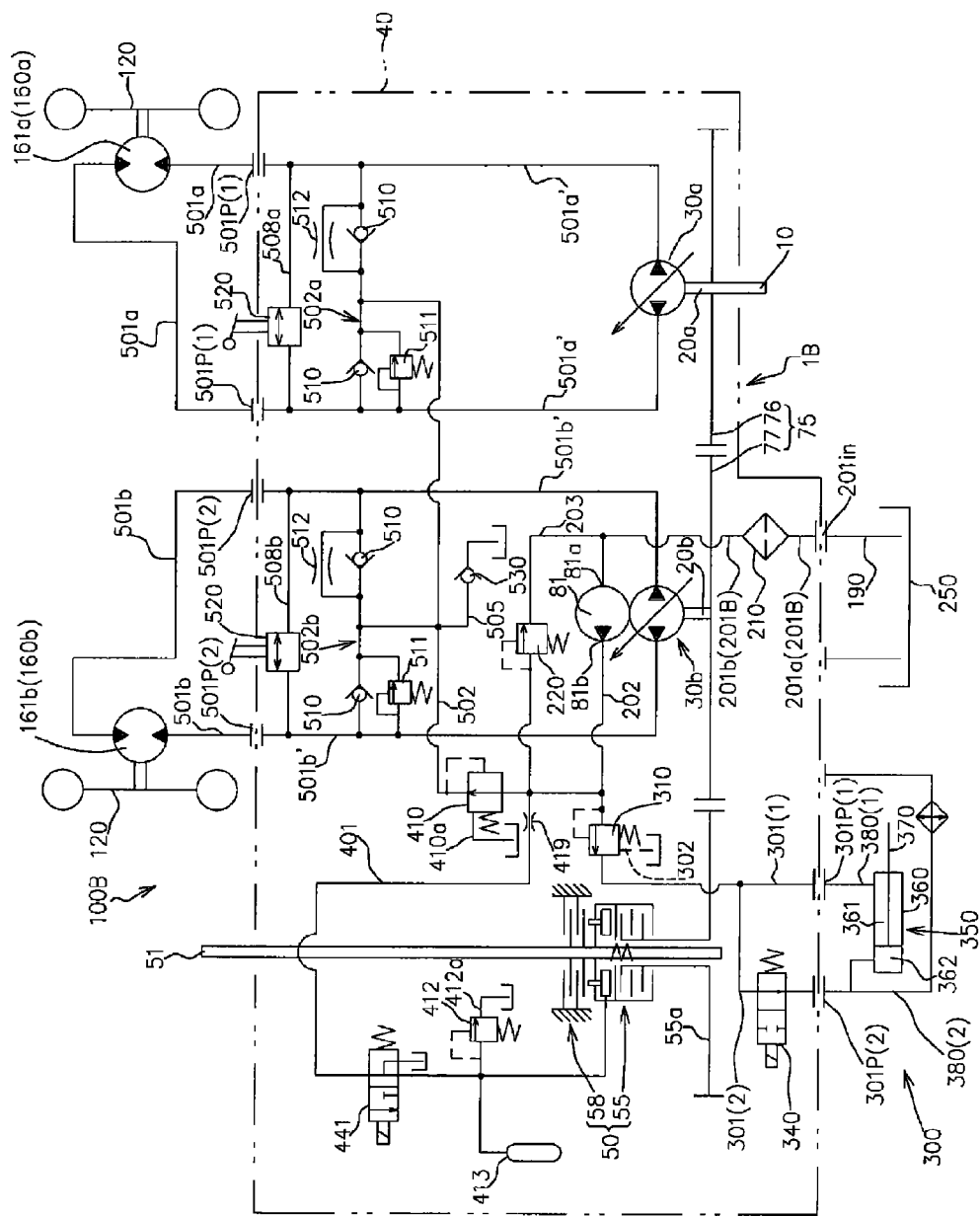
FIG. 15 is a hydraulic circuit diagram of the working vehicle shown in FIG. 14.

FIG. 15 is a hydraulic circuit diagram of the working vehicle 100B.

Figure 16:
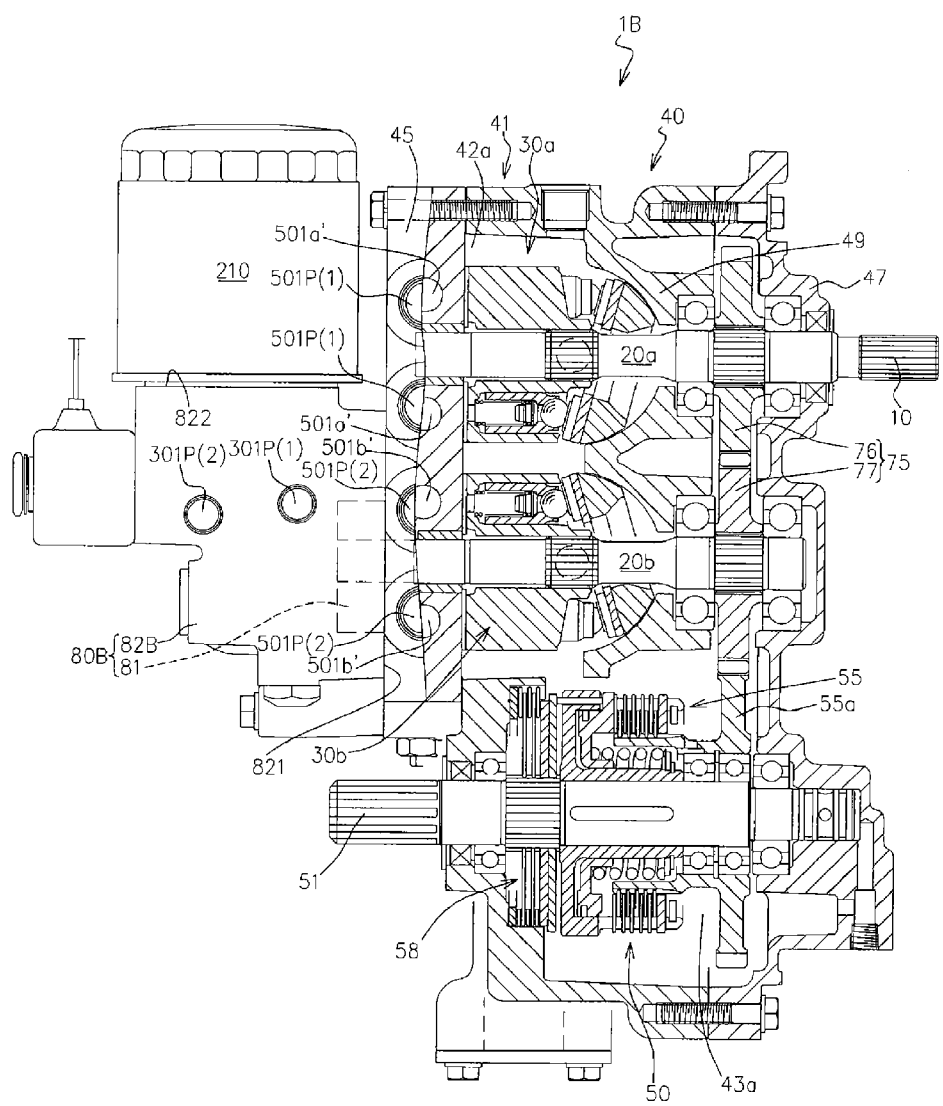
FIG. 16 is a cross sectional plan view of the pump unit according to the second embodiment, respectively.
Figure 17:
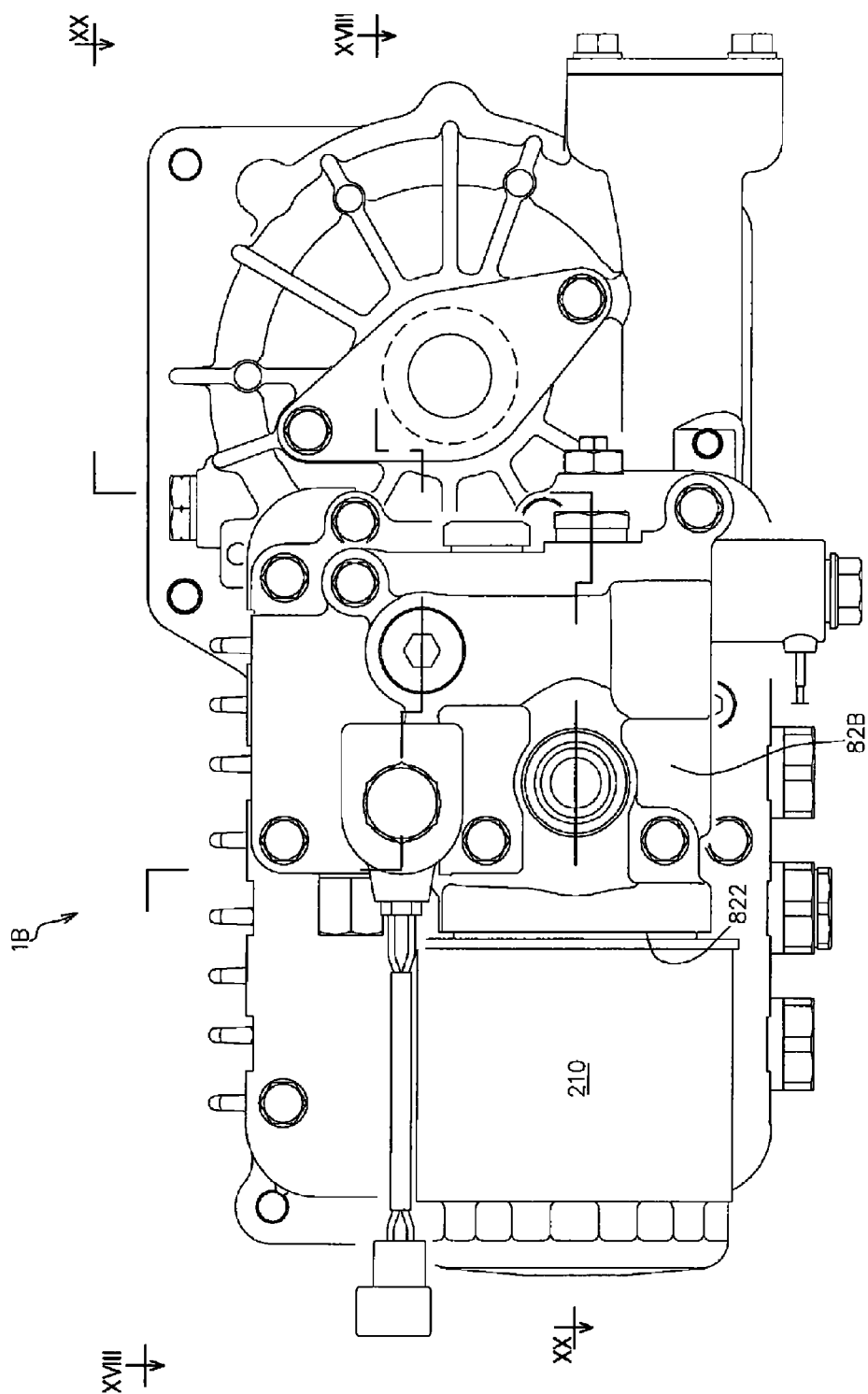
FIG. 17 is a front view of the pump unit shown in FIG. 16.

FIGS. 16 and 17 are a cross sectional plan view and a front view of the pump unit 1B, respectively.

In the figures, the same reference characters are denoted for the same members as in the first embodiment, and the detailed explanations thereof are omitted.

As shown in FIGS. 15 and 16, the pump unit 1B according to the present embodiment include the working machine operating fluid passage 301 for supplying a part of pressurized fluid from the charge pump body 81 toward the external hydraulic device, the charge pump body 81 functioning as a hydraulic pressure source for replenishing the first HST formed by the first hydraulic pump body 30a and a first hydraulic motor body 161a of the first hydraulic motor unit 160a and the second HST formed by the second hydraulic pump body 30b and a second hydraulic motor body 161b of the second hydraulic motor unit 160b, thereby operating a working-machine-system hydraulic actuator such as a hydraulic lifting device without providing an additional hydraulic pressure source such as an auxiliary pump, in the same manner as that in the first embodiment.

Specifically, the pump unit 1B, in the same manner as that in the first embodiment, includes the first hydraulic pump body 30a fluidly connected to the first hydraulic motor body 161a through the pair of first hydraulic lines 501a so as to form a closed circuit, the first hydraulic motor body 161a being disposed away from the pump unit 1B; the second hydraulic pump body 30b fluidly connected to the second hydraulic motor body 161b through the pair of second hydraulic lines 501b so as to form a closed circuit, the second hydraulic motor body 161b being disposed away from the pump unit 1B; the housing 40 for accommodating the first and second hydraulic pump bodies 30a, 30b in such a manner that the first and second hydraulic pump bodies 30a, 30b are operatively driven by the common driving source 150; the charge pump body 81 operatively driven by the driving source 150; a suction fluid passage 201B fluidly connected to the suction side 81a of the charge pump body 81; the discharge fluid passage 202 fluidly connected to the discharge side 81b of the charge pump 81; a charge passage 502 for replenishing a part of the pressurized fluid in the discharge fluid passage 202 into each of the closed circuits, the charge passage 502 including the charge lines 501a, 501b; and the working machine operating fluid passage 301 for supplying a part of the pressurized fluid in the discharge fluid passage 202 toward the external hydraulic actuator.

Similarly to the first embodiment, the pump unit 1B is integrally connected the driving source 150, which is supported by the body frame 110 in a vibrating manner through vibration-absorbing rubbers 151, in a state of having no direct connection to the body frame 110 so as to be capable of vibrating relative to the body frame 110.

With the configuration, the pump unit 1B could receive the rotational power from the driving source 150 without vibration difference between the pump unit 1B and the driving source 150.

Specifically, the pump unit 1B is integrally supported by the driving source 150 through a flywheel cover 159 for covering the flywheel 155 from the outsides.

As shown in FIG. 15, the charge passage 502 is fluidly connected to the discharge fluid passage 202 via the depressurizing valve or pressure-reducing valve 410, in the same way as the first embodiment. A reference numeral 410a is a drain passage of the pressure-reducing valve 410.

As shown in FIG. 15, the working machine operating fluid passage 301 is fluidly connected to the discharge fluid passage 202 via the sequence valve 310, in the same way as the first embodiment.

The pump unit 1B further includes the PTO fluid passage including the first PTO fluid passage 401 which is fluidly connected to the discharge fluid passage 202 via the throttle or orifice 419, in the same way as the first embodiment.

Preferably, as shown in FIG. 16, the working machine operating fluid passage 301 is configured so that its working machine operating fluid port 301P is provided at a surface facing the same direction as the pair of first hydraulic fluid ports 501P(1) of the pair of first hydraulic fluid passages 501a' forming a part of the pair of first hydraulic fluid lines 501a and the pair of second hydraulic fluid ports 501P(2) of the pair of second hydraulic fluid passages 501b' forming a part of the second hydraulic fluid lines 501b, in the same way as the first embodiment (see FIG. 3).

With the configuration, it is possible to improve the workability in connecting external conduits to each of the ports 301P, 501P(1), 501P(2).

Specifically, as shown in FIG. 16, the pair of first hydraulic fluid passages 501a' and the pair of second hydraulic fluid passages 501b' are formed in the center section 45, similarly to the first embodiment.

That is, the pair of first hydraulic fluid passages 501a' are formed in the center section 45 so as to be fluidly connected to the first hydraulic pump body 30a and have first ends opened to an outer surface to form the pair of first hydraulic fluid ports 501P(1).

Similarly, the pair of second hydraulic fluid passages 501b' are formed in the center section 45 so as to be fluidly connected to the second hydraulic pump body 30b and have first ends opened to the outer surface to form the pair of second hydraulic fluid ports 501P(2).

On the other hand, the working machine operating fluid passage 301 is formed in the case surrounding the charge pump body 81, in the same manner as the first embodiment.

Figure 18:
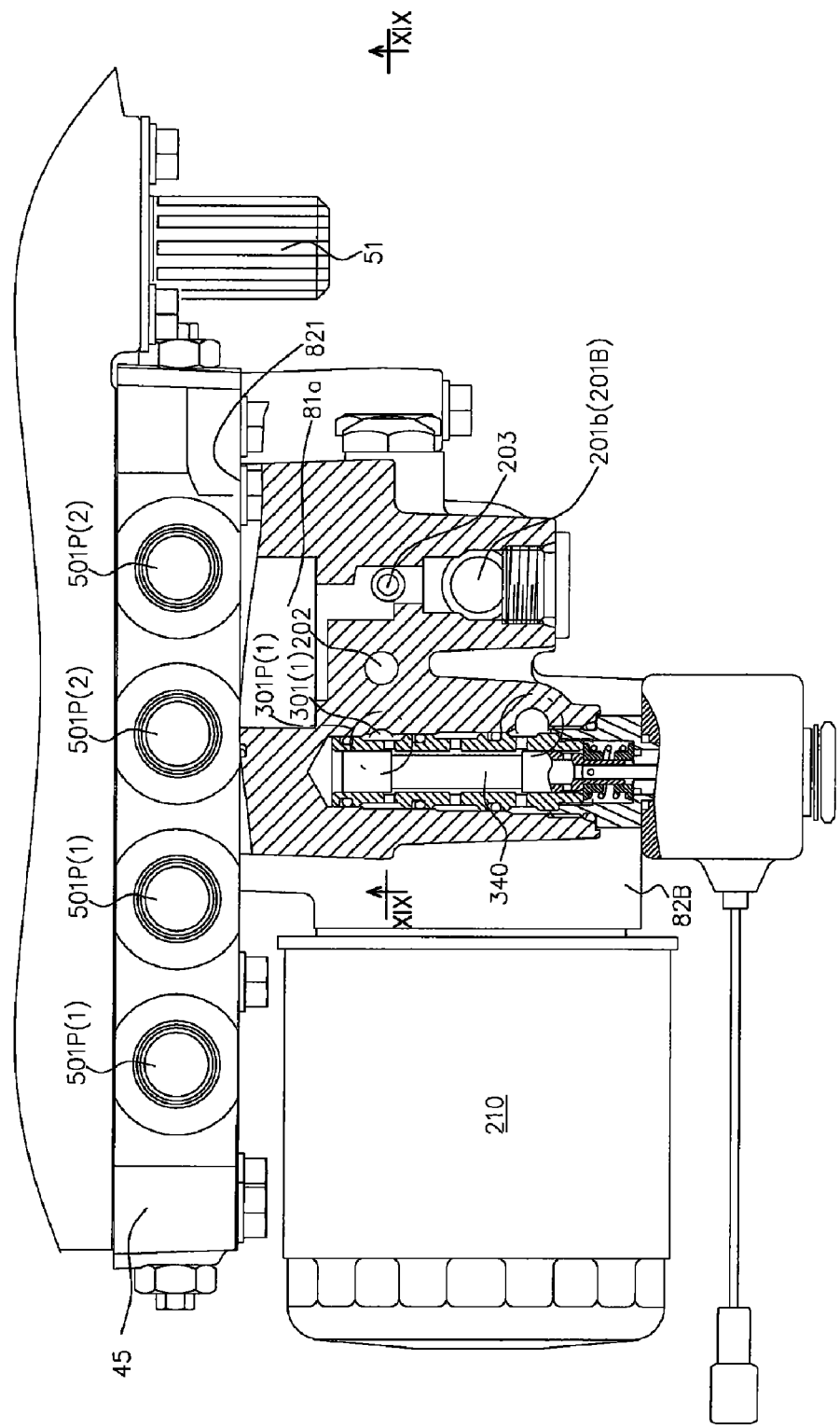
FIG. 18 is a cross sectional view taken along line XVIII-XVIII in FIG. 17.
Figure 19:
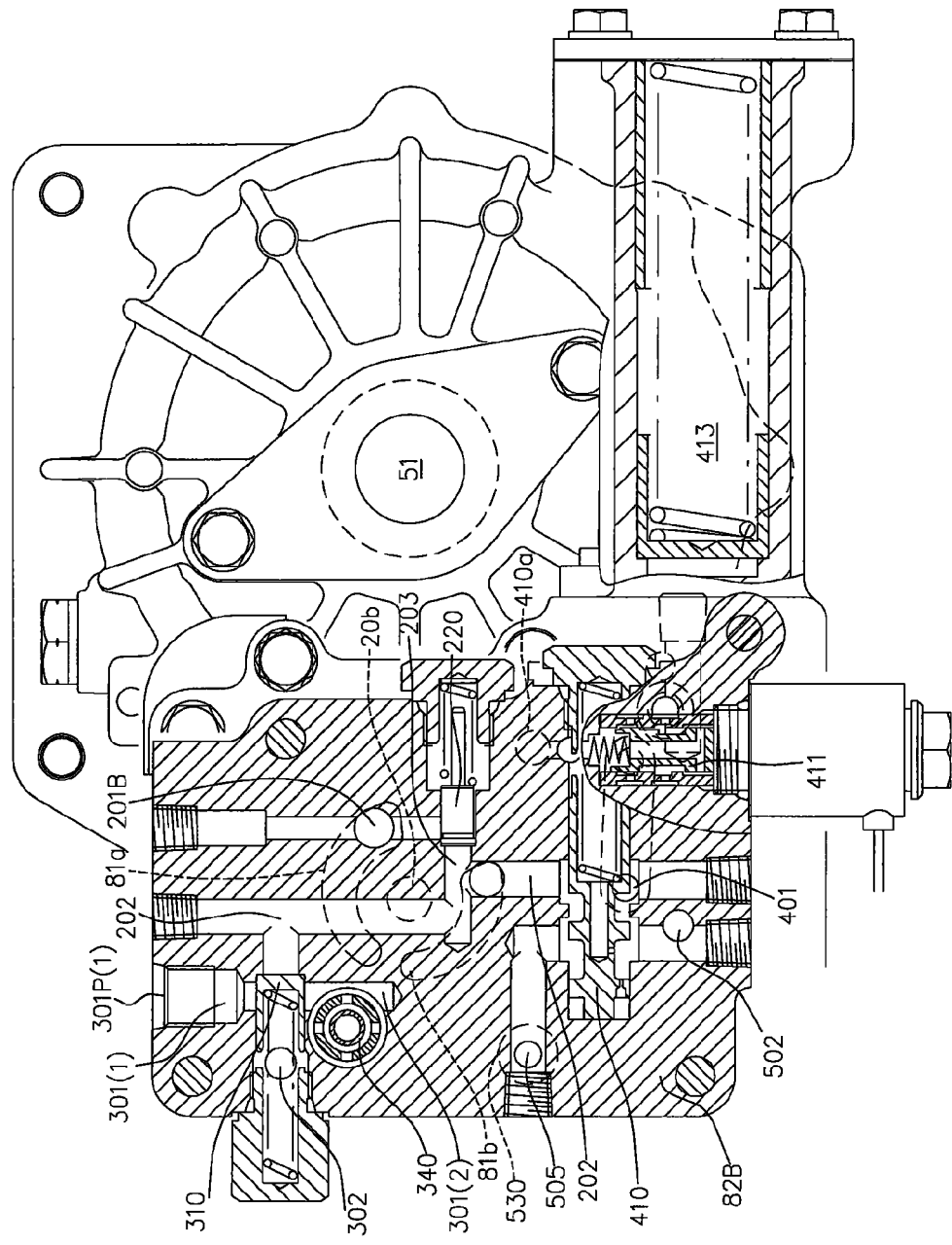
FIG. 19 is a cross sectional view taken along line XIX-XIX in FIG. 18.

FIG. 18 is a cross sectional view taken along line XVIII-XVIII in FIG. 17. FIG. 19 is a cross sectional view taken along line XIX-XIX in FIG. 18.

Specifically, the pump unit 1B according to the present embodiment includes a charge pump case 82B instead of the charge pump case 82, in the pump unit 1 according to the first embodiment.

The working machine operating fluid passage 301, as shown in FIG. 16, is formed in the charge pump case 82B so that the working machine operating fluid port 301P is directed to the same direction as the pair of first hydraulic fluid ports 501P(1) and the pair of second hydraulic fluid ports 501P(2).

The pump unit 1B according to the present embodiment, as shown in FIG. 15, further includes a working machine switching valve 340 for selectively communicating or shutting off the working machine operating fluid passage 301, thereby simplifying the structure of the working machine operating hydraulic circuit 300.

That is, the working machine switching valve 340 is inserted within an external conduit for fluidly connecting between the hydraulic pressure source such as the auxiliary pump and the external hydraulic actuator in the prior arts. In the conventional configuration, an exclusive mounting member such as a mounting stay for fixing the working machine switching valve 340 at a portion to be mounted such as the body frame 110 is needed. Further, in the conventional configuration, it is needed to fluidly connect between the hydraulic pressure source and the working machine switching valve 340 via one external conduit and to fluidly connect between the working machine switching valve 340 and the external hydraulic actuator via another external conduit. Consequently, the conventional configuration poses the problem of increasing the cost due to increase of the number of components and deterioration of assembling workability.

On the other hand, in the present embodiment, the working machine switching valve 340 is mounted at the pump unit 1B, as explained above. The thus configured pump unit 1B could omit the exclusive mounting member and simplify the piping work. In the present embodiment, the working machine switching valve 340 is mounted at the charge pump case 82B, as shown in FIGS. 18 and 19.

In the present embodiment, the working vehicle 100B includes a hydraulic lifting device 350 for lifting up and down the mower device 140 as the external hydraulic actuator.

The hydraulic lifting device 350 includes a cylinder 360 and a piston 370 accommodated in the cylinder 360 in a reciprocating manner, the piston 370 dividing an internal space of the cylinder into a lifting-up chamber 361 and a lifting-down chamber 362. The hydraulic lifting device 350 moves up or down the mower device 140 by selectively fluidly connecting the lifting-up chamber 361 to a hydraulic pressure source or a fluid sump.

The pump unit 1B according to the present embodiment includes first and second working machine operating fluid passages 301(1), 301(2) as the working machine operating fluid passage 301 in order to properly operate the hydraulic lifting device 350.

Specifically, the first working machine operating fluid passage 301(1) has a proximal end fluidly connected to the discharge fluid passage 202 via the sequence valve 310 and a distal end opened to the outer surface of the charge pump case 82B to form a first working machine operating fluid port 301P(1).

The second working machine operating fluid passage 301(2) has a proximal end fluidly connected to the discharge fluid passage 202 via the sequence valve 310 and a distal end opened to the outer surface of the charge pump case 82B to form a second working machine operating fluid port 301P(2).

The first port 301P(1) is fluidly connected to the lifting-up chamber 361 through a first external conduit 380(1).

The second port 301P(2) is connected to a second external conduit 380(2). Specifically, the second external conduit 380(2) has a proximal end connected to the second port 301P(2) and distal ends that are branched so as to be fluidly connected to the lifting-down chamber 362 and the fluid sump.

In the configuration, the working machine switching valve 340 is inserted within the second working machine operating fluid passage 301(2).

The hydraulic lifting device 350 operates as follows according to the operating control of the working machine switching valve 340.

When the working machine switching valve 350 shuts off the second working machine operating fluid passage 301(2), the first working machine operating fluid passage 301(1) that is fluidly connected to the lifting-up chamber 361 is fluidly disconnected to the fluid sump. Consequently, the pressurized fluid flows into the lifting-up chamber 361 so that the piston 370 moves to the direction which causes the mower device 140 to move up.

On the other hand, when the working machine switching valve 340 communicates the second working machine operating fluid passage 301(2), the first working machine operating fluid passage 301(1) that is fluidly connected to the lifting-up chamber 361 is fluidly connected to the fluid sump through the second working machine operating fluid passage 301(2) and the second external conduit 380(2). Consequently, the pressure in the lifting-up chamber 361 is not increased so that the mower device 140 moves down due to its own weight.

In a case where the first and second working machine operating fluid passages 301(1), 301(2) are provided as the working machine operating fluid passage 301 as in the above configuration, the first and second ports 301P(1), 301P(2) are preferably arranged so as to face the same direction.

More preferably, all of the first and second ports 301P(1), 301p(2), and the pair of first hydraulic fluid ports 501P(1) and the pair of second hydraulic fluid ports 501P(2) are arranged so as to face the same direction.

Furthermore, in the present embodiment, the filter 210 inserted within the charge line for replenishing the operation fluid from the reservoir tank 250 into the closed circuits is mounted at the pump unit 1B, thereby simplifying the filtering structure for filtering the charge line.

That is, in the first embodiment, the filter 210 inserted within the charge line is fixed at a portion to be mounted such as the body frame 110 via an exclusive mounting member such as a mounting stay, in a state of being positioned away from the pump unit 1 that includes the hydraulic pump bodies 30a, 30b.

In the configuration, it is needed another mounting work for mounting the filter 210 at the body frame 110 or the like via the exclusive mounting member, in addition to the mounting work for the pump unit 1. Moreover, it is needed to fluidly connect between the reservoir tank 250 and the filter 210 via one external conduit and to fluidly connect between the filter 210 and the closed circuits via another external conduit, resulting in complicating the piping work in forming the filtering structure.

On the other hand, as explained above, the filter 210 is mounted at the pump unit 1B in the present embodiment.

With the configuration, it is unnecessary to separately mount the filter 210 at the body frame 110 or the like, and the another conduit for fluidly connecting between the filter 210 and the closed circuits could be omitted, thereby simplifying the filtering structure.

Figure 20:
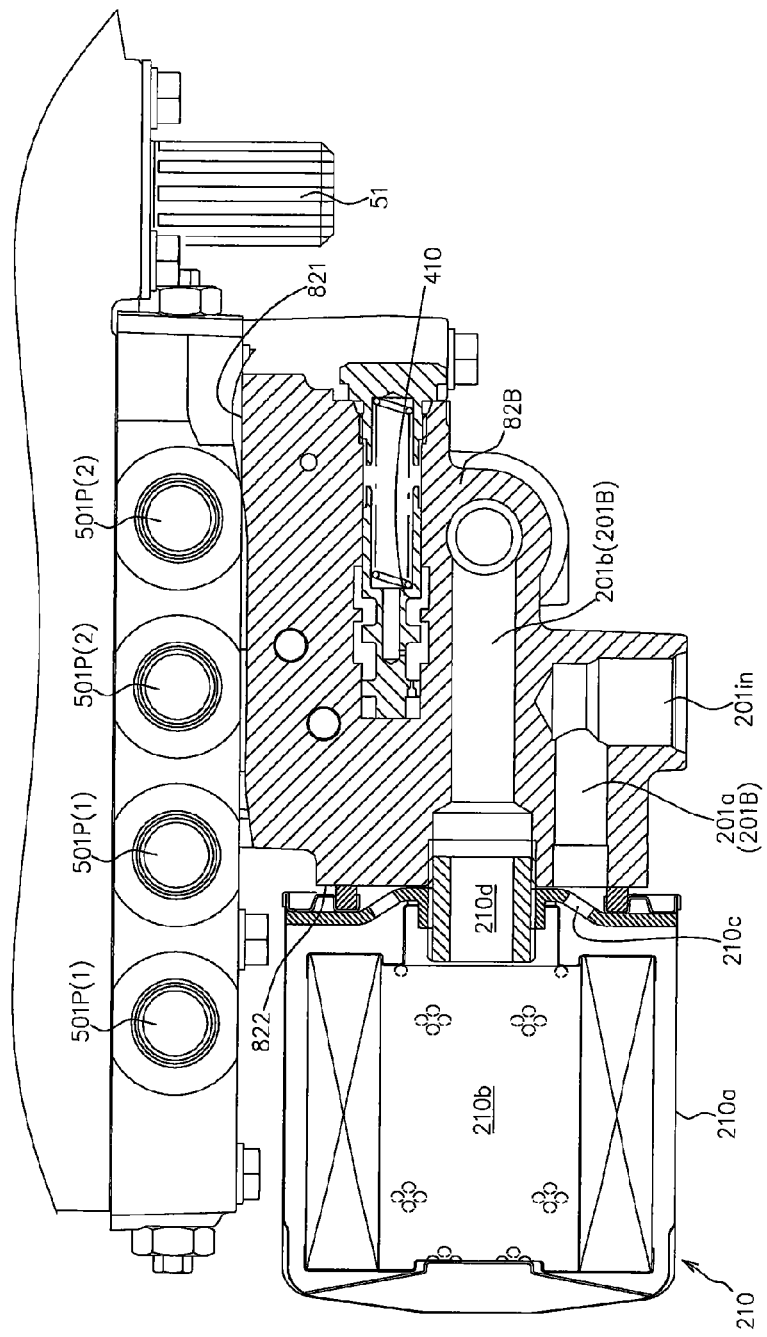
FIG. 20 is a cross sectional view taken along line XX-XX in FIG. 17.

FIG. 20 is a cross sectional view taken along line XX-XX in FIG. 17.

As shown in FIGS. 16-18 and 20, in the present embodiment, the filter 210 is mounted at the charge pump case 82B so as to be inserted within the suction fluid passage 201B.

Specifically, either one (hereinafter referred to as charge-driving-side pump shaft) of the first and second pump shafts 20a, 20b has one end extended outwards from the housing 40 to form an output end, the output end driving the charge pump body 81, in the same manner as the first embodiment.

In the present embodiment, the second pump shaft 20b functions as the charge-driving-side pump shaft as shown in FIG. 16, and the end away from the driving source 15, out of the opposite ends of the second pump shaft 20b, is extended outwards from the center section 45.

The charge pump case 82B includes a contacting surface 821 to which the center section 45 is contacted, and a filter-mounting surface 822 to which the filer 210 is mounted, as shown in FIGS. 16, 18 and 20.

Preferably, the filter 210 is mounted at the mounting surface 822 so as to overlap with the hydraulic pump body (the first hydraulic pump body 30a in the present embodiment) driven by the pump shaft (the first pump shaft 20a in the present embodiment, and hereinafter referred to as charge-non-driving-side pump shaft) that is different from the charge-driving-side pump shaft when seen from the front along the axial direction of the first and second pump shafts 20a, 20b, as shown in FIGS. 16 and 17.

With the configuration, it is possible to utilize a dead space in the pump unit 1B as a mounting space for the filer 210.

Specifically, the charge pump case 82B has outer surfaces orthogonal to an imaginary plane passing the axis line of the charge-driving-side pump shaft (the second pump shaft 20b in the present embodiment) and the axis line of the charge-non-driving-side pump shaft (the first pump shaft 20a in the present embodiment), and is configured to utilize one outer surface closed to the charge-non-driving-side pump shaft on the basis of the axis line of the charge-driving-side pump shaft, out of the outer surfaces, as the filter-mounting surface 822.

In the present embodiment, on the basis of the mounting state where the pump unit 1B is mounted at the working vehicle 100B, the first pump shaft 20a functioning as the charge-non-driving-side pump shaft and the second pump shaft 20b functioning as the charge-driving-side pump shaft extend along the fore-and-aft direction of the working vehicle, and are arranged in parallel so that the first and second pump shafts are respectively inward and outward in the width direction of the working vehicle.

In the configuration, the outer side surface facing inward in the vehicle width direction, out of the outer surfaces of the charge pump case 82B, forms the filter-mounting surface 822.

Alternatively to the configuration, it may be configured that the first pump shaft 20 functioning as an input-side pump shaft that operatively receives the rotational power from the driving source 150 also functions as the charge-driving-side pump shaft.

Figure 21:
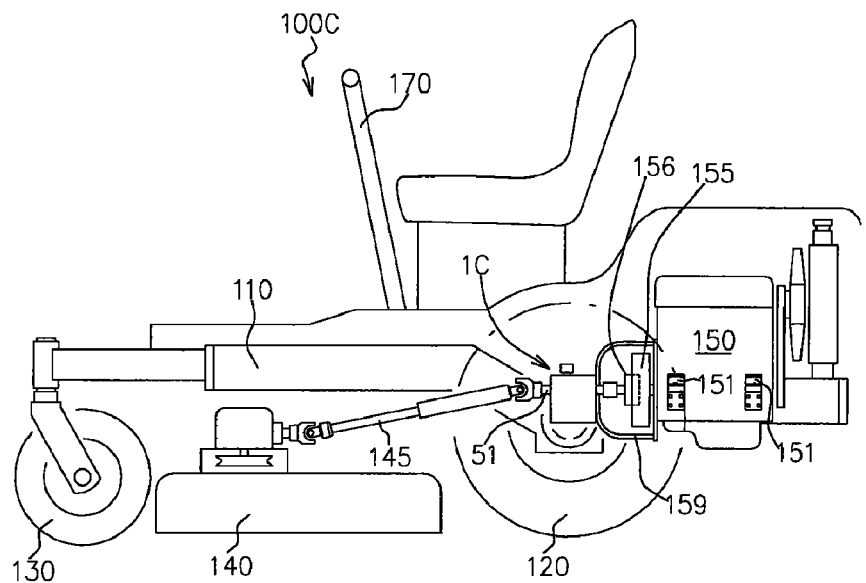
FIGS. 21(a) and 21(b) are a side view and a plan view of a working vehicle to which a modified embodiment of the second embodiment is applied, respectively.
Figure 21:
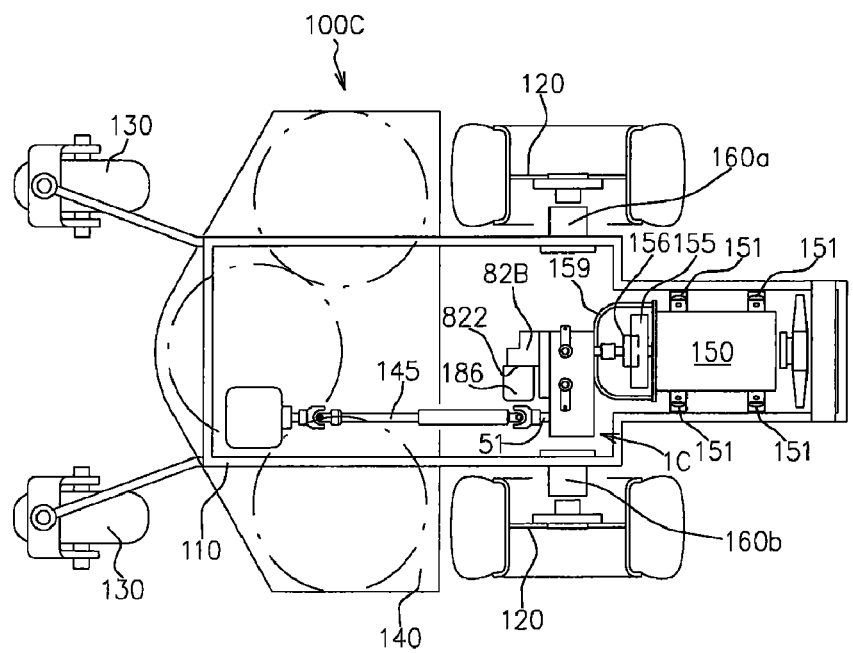

FIG. 21(a) and 21(b) are, respectively, a side view and a plan view of a working vehicle 100C to which a modified embodiment 1C of the pump unit 1B according to the present embodiment is applied.

In the modified pump unit 1C, the first pump shaft 20a that is positioned inward in the vehicle width direction and that functions as the input-side pump shaft also functions as the charge-driving-side pump shaft.

In the modified configuration, out of the outer surfaces of the charge pump case 82B, the outer surface that is orthogonal to the imaginary plane passing the axis lines of the first and second pump shafts 20a, 20b and is closed to the second pump shaft 20b on the basis of the axis line of the first pump shaft 20a, that is, the outer surface facing outward in the vehicle width direction functions as the filter-mounting surface 822.

The filter 210 is mounted at the filter-mounting surface 822 so as to be inserted within the suction fluid passage 201B.

Specifically, as shown in FIG. 20, the suction fluid passage 201B includes an upstream-side passage 201a having a first end opened to an outer surface to form a suction port 201 in and a second end opened to the filter-mounting surface 822, and a downstream-side passage 201b having a first end opened to the filter-mounting surface 822 and a second end fluidly connected to the suction side 81a of the charge pump body 81, in the present embodiment.

The suction port 201 in is fluidly connected to the reservoir tank 250 via an external conduit 190, as shown in FIG. 15.

The filter 210, as shown in FIG. 20, includes a filer case 210a having a contact surface contacted to the filer-mounting surface 822, a filter body 210b accommodated in the filter case 210a, a filter-side suction passage 210c having an opening opened to the contact surface so as to fluidly connect the upstream-side passage 201a, and a filter-side discharge passage 210d having an opening opened to the contact surface so as to fluidly connect to the downstream-side passage 201b, the filer-side discharge passage 210d being fluidly connected to the filter-side suction passage 210c through the filter body 210b.

The filter body 210b has a hollow shape. The filer-side suction passage 210c is fluidly connected to one of a gap between an outer surface of the filer body 210b and an inner surface of the filter case 210a or a hollow portion of the filter body 210b, and the filter-side discharge passage 210d is fluidly connected to the other of the gap or the hollow portion.

In the present embodiment, the filer-side suction passage 210c is fluidly connected to the gap, and the filter-side discharge passage 210d is fluidly connected to the hollow portion, as shown in FIG. 20.

As explained above, in the present embodiment, the filer-mounting surface 822 faces in the vehicle width direction. Consequently, the filter 210 is mounted at the filter-mounting surface 822 so as to be orthogonal to the axis line of the charge-driving-side pump shaft in a state where the openings of the filter-side suction passage 210c and the filter-side discharge passage 210d face in the horizontal direction.

However the PTO shaft 51 is arranged in parallel to the first and second pump shafts 20a, 20b in the vehicle width direction in the present embodiment (see FIG. 14) and the modified embodiment (see FIG. 21), the present invention is not necessarily limited to the configuration.

FIGS. 22(a) and 22(b) are, respectively, a side view and a plan view of a working vehicle 100D equipped with another modified embodiment 1D of the pump unit 1B according to the present embodiment.

Figure 23:
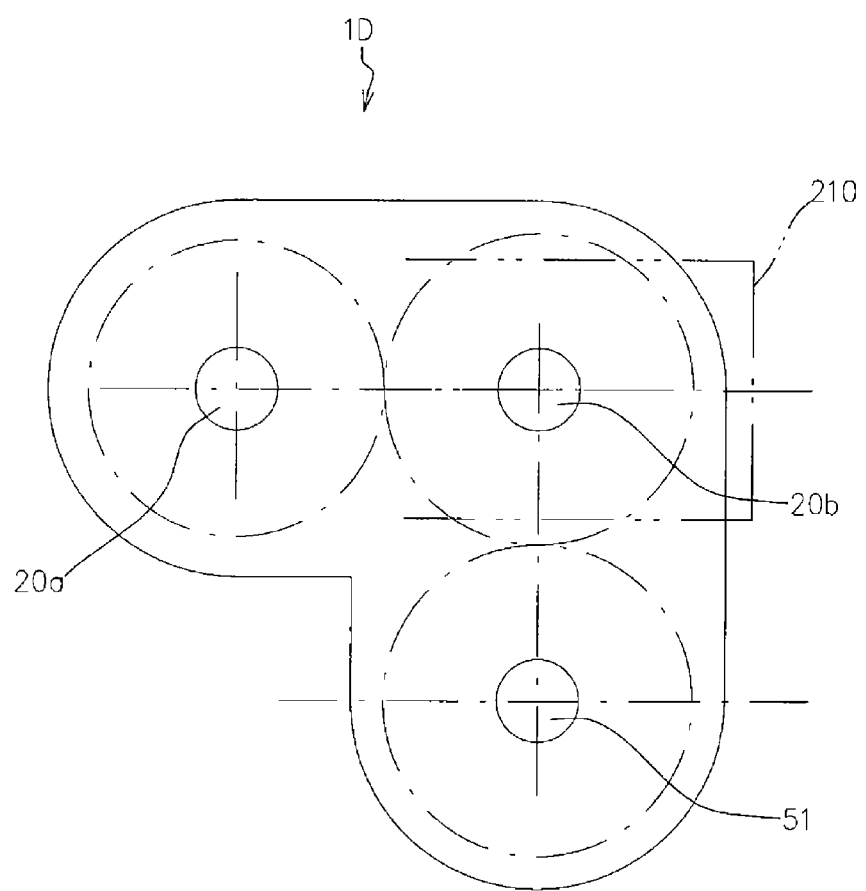
FIG. 23 is a schematic front view of the pump unit 1D shown in FIG. 22.

FIG. 23 is a schematic front view of the pump unit 1D according to the modified embodiment.

Figure 22:
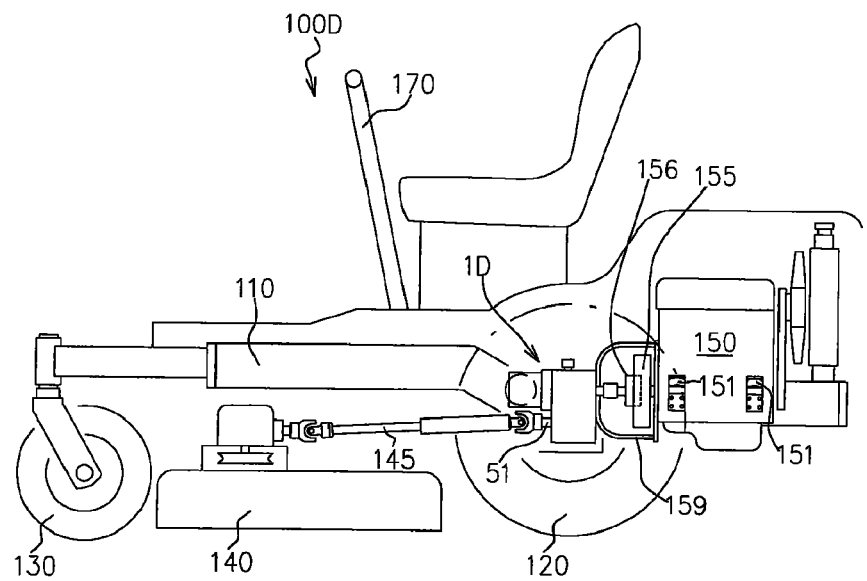
FIGS. 22(a) and 22(b) are a side view and a plan view of a working vehicle to which another modified embodiment the second embodiment is applied, respectively.
Figure 22:
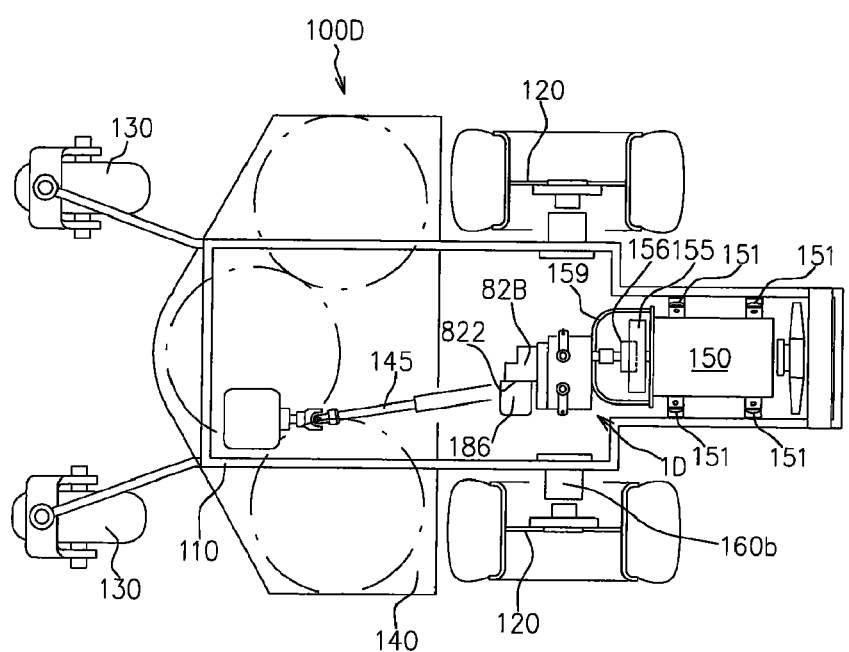

As shown in FIGS. 22 and 23, in the modified pump unit 1D, the first pump shaft 20a functions as both the input-side pump shaft and the charge-driving-side pump shaft, the second pump shaft 20b which is the charge-non-driving-side pump shaft is arranged in parallel to the first pump shaft 20a in the vehicle width direction, and PTO shaft 51 is arranged at the substantially same position in the vehicle width direction and below in the vertical direction with respect to the second pump shaft 20b.

In the modified pump unit 1D, the filter 210 is arranged at a space above the extending end of the PTO shaft 51 so as to overlap with the second hydraulic pump body 30b when seen from the front.

With the configuration, the PTO shaft 51 could be arranged at a below position, while achieving the above various effects. Consequently, an inclination angle of the transmission shaft 145 that is connected to the PTO shaft 51 could be decreased with respect to the up-and-down direction.

Embodiment 3

Still another embodiment of the pump unit according to the present invention will now be described with reference to the attached drawings.

Figure 24:
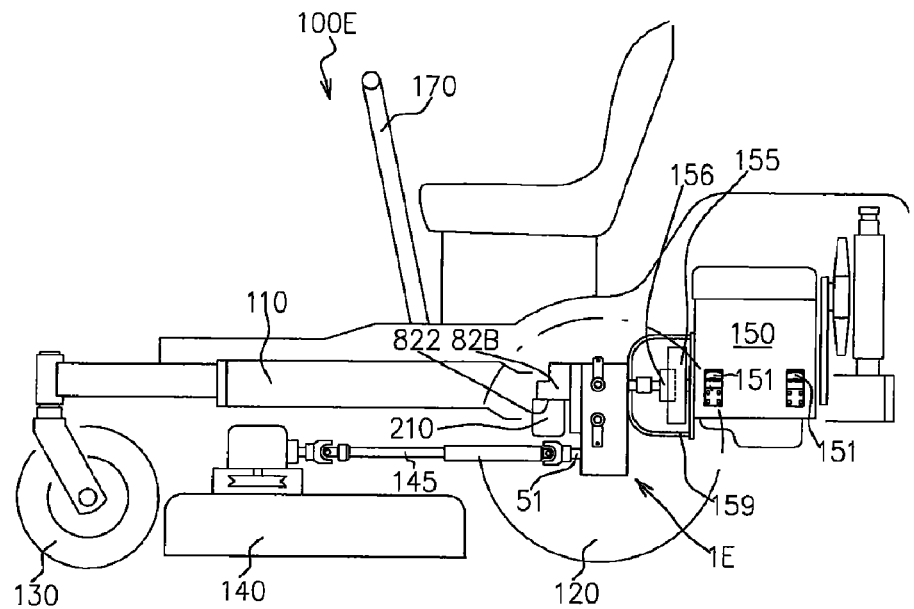
FIGS. 24(a) and 24(b) are a side view and a plan view of a working vehicle to which a pump unit according to a third embodiment is applied, respectively.
Figure 24:
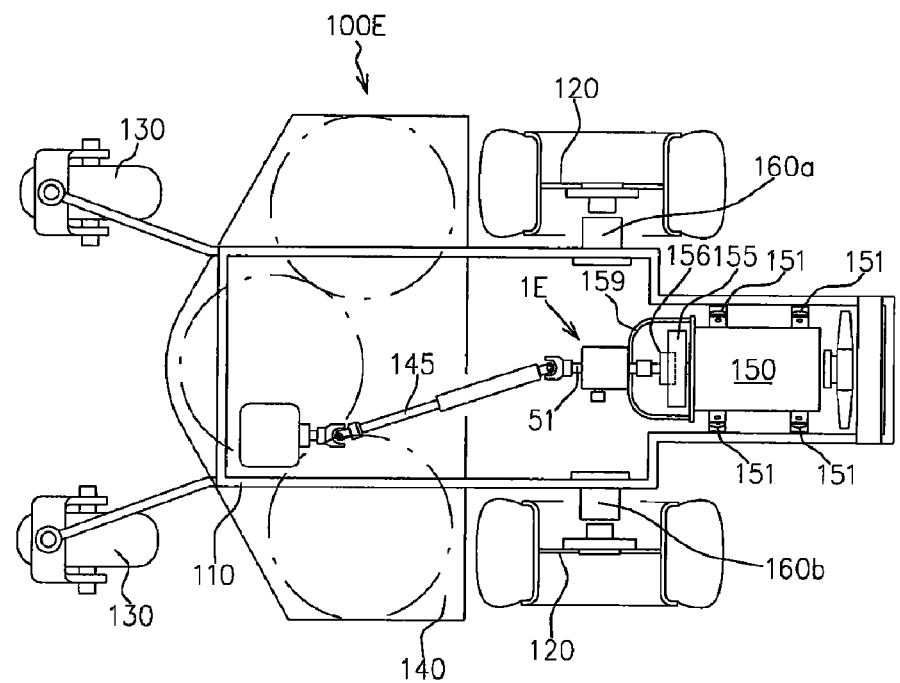

FIGS. 24(a) and 24(b) are a side view and a plan view of a working vehicle 100E to which a pump unit 1E according to the present embodiment is applied, respectively.

Figure 25:
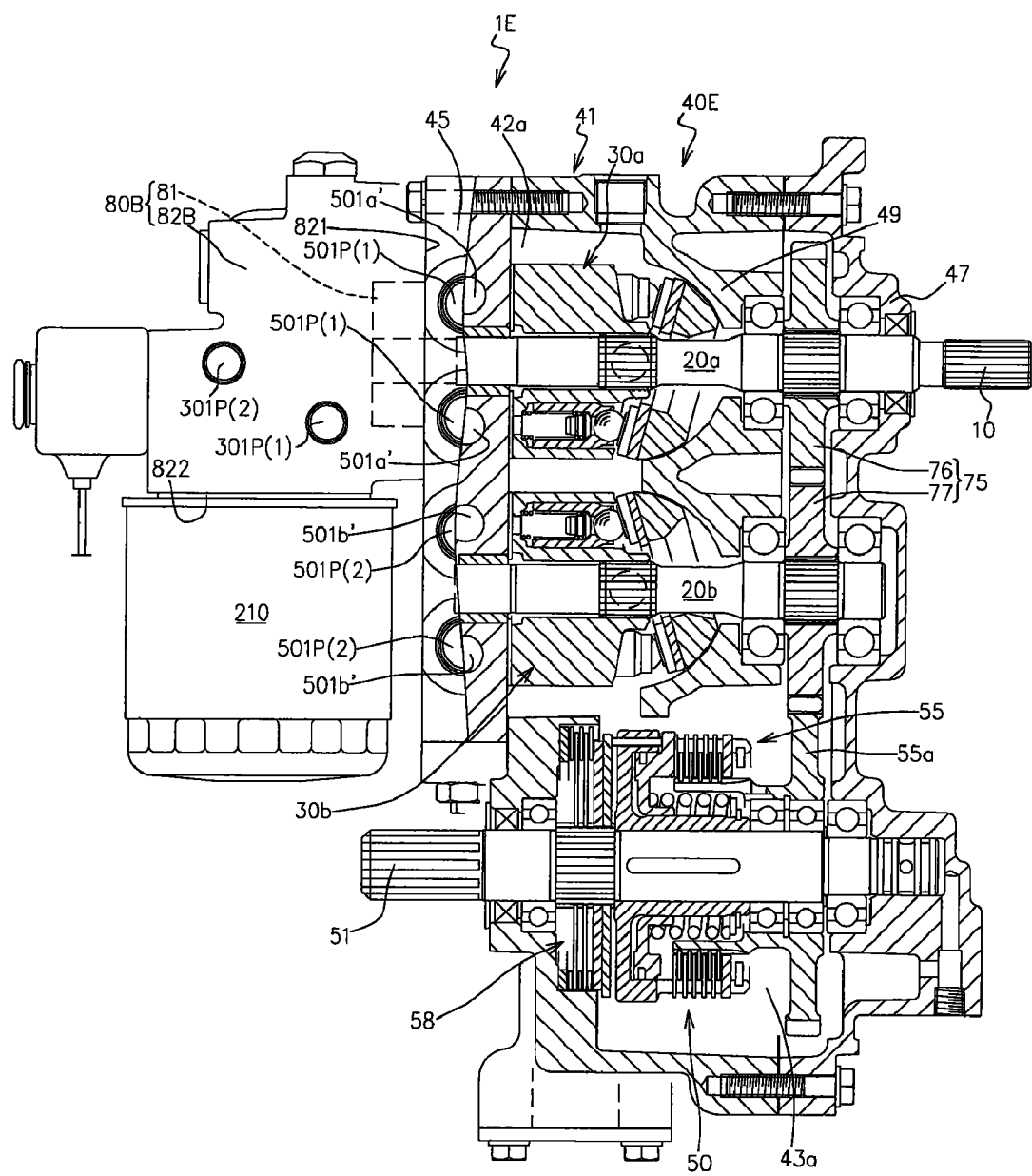
FIG. 25 is a vertical cross sectional side view of the pump unit shown in FIG. 24.

FIG. 25 is a vertical cross sectional side view of the pump unit 1E.

In the figures, the same reference characters are denoted for the same members as in the second embodiment, and the detailed explanations thereof are omitted.

Figure 14:
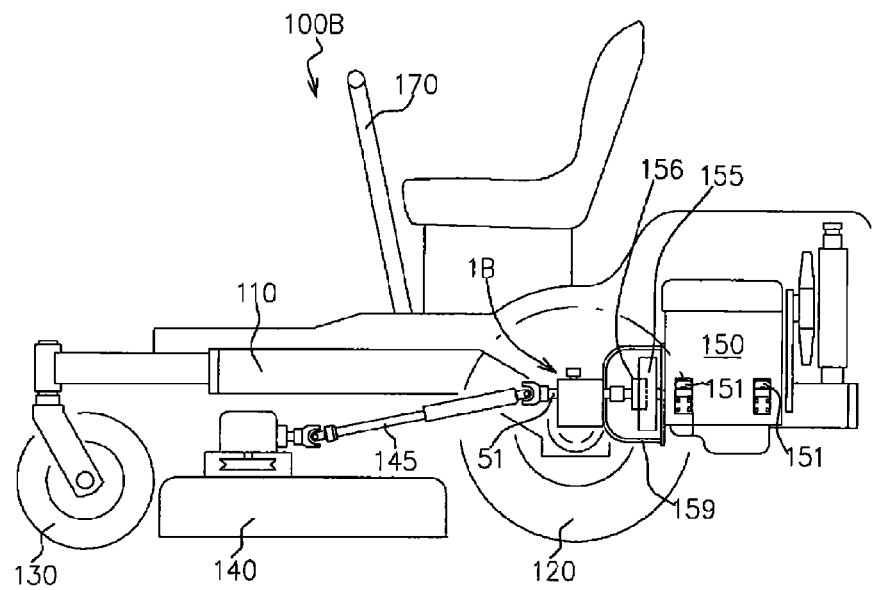
FIGS. 14(a) and 14(b) are a side view and a plan view of the working vehicle to which the pump unit according to a second embodiment of the present invention is applied, respectively.
Figure 14:
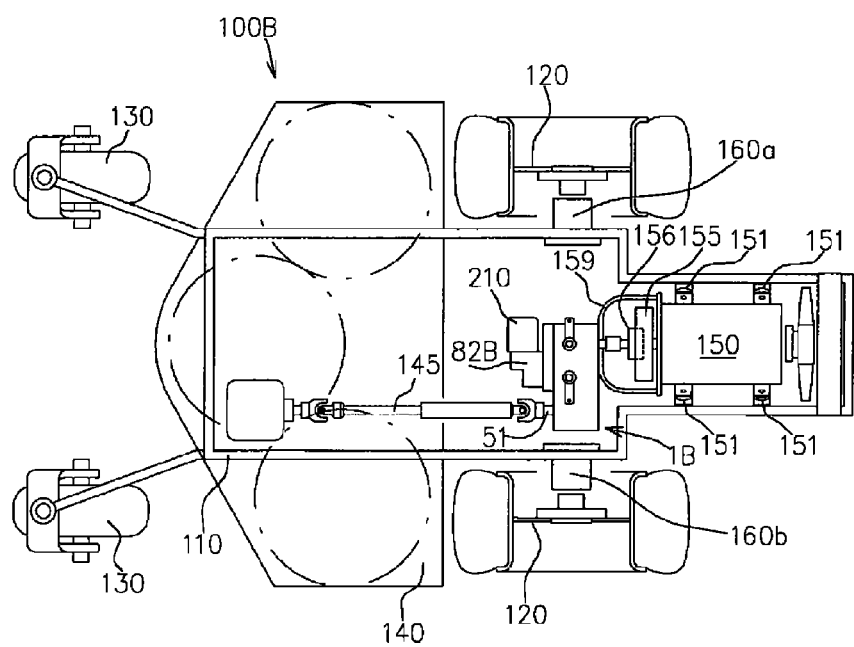

In the second embodiment, the filter 210 is mounted at the charge pump case 82B so as to extend along a horizontal direction on the basis of the mounting state of the pump unit 1B (see FIG. 14).

On the other hand, in the pump unit 1E according to the present embodiment, the filter 210 is mounted at the charge pump case 82B so that the openings of the filer-side suction passage 210c and the filter-side discharge passage 210d face upward on the basis of the mounting state of the pump unit 1E.

The configuration where the filter 210 is mounted at the charge pump case 82B so that the openings of the filer-side suction passage 210c and the filter-side discharge passage 210d face upward effectively prevents air from remaining within in the filter 210, thereby stabilizing the operation of the hydraulic devices to which operation fluid are supplied through the discharge fluid passage 202.

Specifically, the pump unit 1E according to the present embodiment includes a housing 40E in place of the housing 40 in the pump unit 1B according to the second embodiment.

The housing 40E supports the first pump shaft 20a, the second pump shaft 20b and the PTO shaft 51 so that the second pump shaft 20b functioning as the charge-non-driving-side pump shaft is positioned substantially vertically below the first pump shaft 20a functioning as both the input-side pump shaft and the charge-driving-side pump shaft, and the PTO shaft 51 is positioned below the second pump shaft 20b.

In the configuration, the filter 210 is mounted at an outer surface facing below, out of the outer surfaces of the charge pump case 82B surrounding the charge pump body 81 driven by the first pump shaft 20a, in a state that the openings of the filer-side suction passage 210c and the filter-side discharge passage 210d are directed upward.

The pump unit 1E according to the present embodiment could prevent the air from retaining within the filter 210 and position the PTO shaft 51 as low as possible, thereby decreasing the inclination angle of the transmission shaft 145, which transmits rotational power from the PTO shaft 51 to the mower device 140, with respect to the up-and-down direction, in addition to the effects in the second embodiment.

FIGS. 26(a) and 26(b) are respectively a side view and a plan view of a working vehicle 100F to which a modified pump unit 1F to the pump unit 1E is applied.

Figure 27:
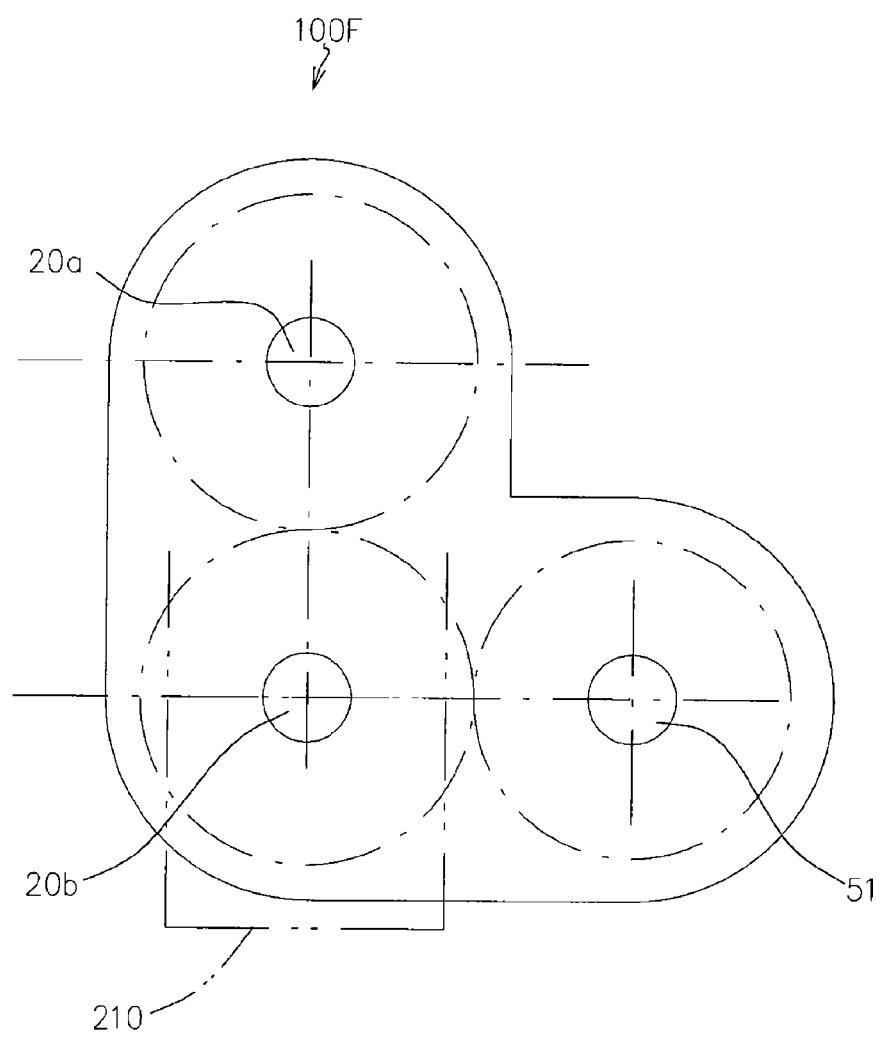
FIG. 27 is a schematic front view of the modified pump unit shown in FIG. 26.

FIG. 27 is a schematic front view of the modified pump unit 1F.

Figure 26:
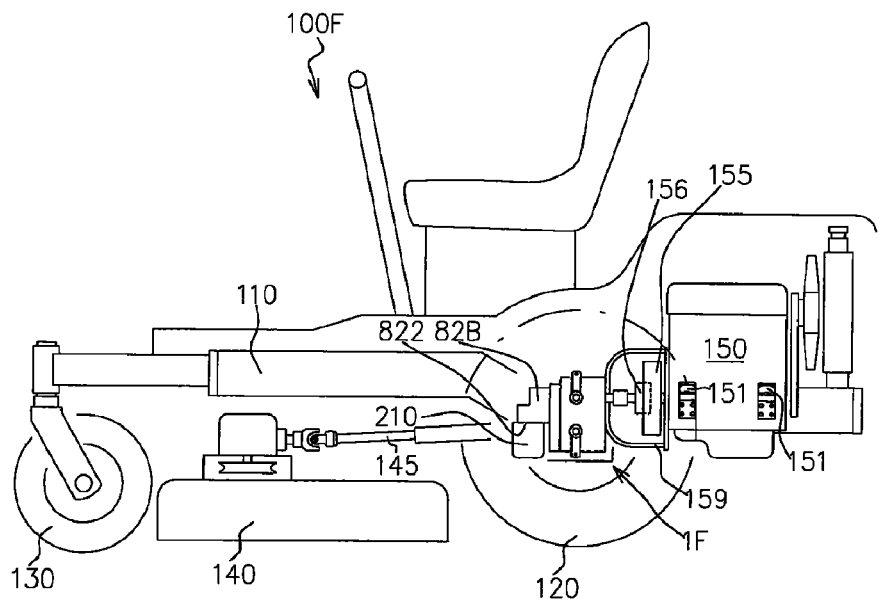
FIGS. 26(a) and 26(b) are a side view and a plan view of a working vehicle to which a modified pump unit of the third embodiment is applied, respectively.
Figure 26:
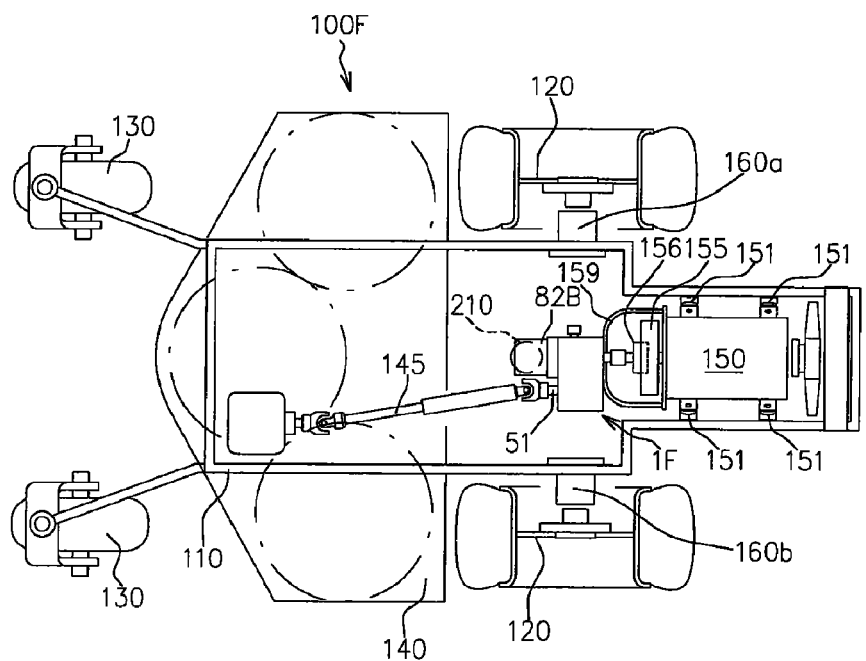

As shown in FIGS. 26 and 27, the pump unit 100F according to the modified embodiment supports the first pump shaft 20a, the second pump shafts 20b and the PTO shaft 51 so that the second pump shaft 20b functioning as the charge-non-driving-side pump shaft is positioned substantially vertically below the first pump shaft 20a functioning as the charge-driving-side pump shaft, and the PTO shaft 51 is displaced from the second pump shaft 20b in the vehicle width direction.

In the modified pump unit 100F, the filter 210 is mounted at the outer surface facing below, out of the outer surfaces of the charge pump case 82B surrounding the charge pump body 81 driven by the first pump shaft 20a, in a state that the openings of the filer-side suction passage 210c and the filter-side discharge passage 210d are directed upward.

The modified pump unit 1F could also arrange the PTO shaft at a below position while preventing the air from remaining within the filter 210.

This specification is by no means intended to restrict the present invention to the preferred or modified embodiments set forth therein. Various modifications to the pump unit may be made by those skilled in the art without departing from the spirit and scope of the present invention as defined in the appended claims.

What is claimed is:

1. A pump unit including a plurality of hydraulic pump bodies respectively fluidly connected to a plurality of hydraulic motor bodies, which are disposed away from the pump unit, so as to form closed circuits, the pump unit comprising:
   a housing accommodating the plurality of hydraulic pump bodies so that the plurality of hydraulic pump bodies are operatively driven by a common driving source, the housing including a hollow housing body formed with an opening that has a size allowing the plurality of hydraulic pump bodies to pass therethrough, and a center section connected to the housing body so as to liquid-tightly close the opening;
   a charge pump body operatively driven by the driving source;
   a charge pump case connected to the housing so as to surround the charge pump body;
   hydraulic fluid passages forming a part of the closed circuit;
   a suction fluid passage fluidly connected to a suction side of the charge pump body;
   a discharge fluid passage fluidly connected to a discharge side of the charge pump body;
   a charge passage for replenishing a part of pressurized fluid in the discharge fluid passage into each of the closed circuits;
   a working machine operating fluid passage for supplying a part of the pressurized fluid in the discharge fluid passage toward an external hydraulic actuator;
   a working machine switching valve for selectively communicating or shutting off the working machine operating fluid passage;
   a filter inserted in the suction fluid passage;
   a relief valve that has a primary side fluidly connected to the discharge fluid passage;
   a sequence valve interposed between the discharge fluid passage and the working machine operating fluid passage;
   a pressure-reducing valve interposed between the discharge fluid passage and the charge passage;
   wherein the hydraulic fluid passages are formed in the center section so as to be fluidly connected to the corresponding bodies and have first ends opened at an outer surface to form hydraulic fluid ports;
   wherein the working machine operating fluid passage is formed in the charge pump case so as to have a proximal end fluidly connected to the discharge fluid passage via the sequence valve and a distal end opened at an outer surface to form a working machine operating fluid port; and
   wherein the filter, the working machine switching valve, the relief valve, and the sequence valve are mounted to the charge pump case.

2. A pump unit according to claim 1, wherein
   the distal end of the working machine operating fluid passage is branched so as to have two working machine operating fluid ports; and
   the working machine switching valve is inserted within one of the two branched passages.

3. A pump unit according to claim 1, wherein
   the hydraulic fluid ports and the working machine operating fluid port are faced to the same direction with respect to one another.

4. A pump unit according to claim 1, further comprising:
   a power take-off (PTO) shaft operatively driven by the common driving source;

a hydraulic PTO clutch for selectively engaging or disengaging power transmission from the common driving source to the PTO shaft;
a PTO fluid passage having a proximal end fluidly connected to the discharge fluid passage via an orifice and a distal end fluidly connected to the PTO clutch;
a PTO switching valve inserted within the PTO fluid passage; and
a PTO relief valve having a primary side fluidly connected to the PTO fluid passage.

* * * * *